US012565163B2

(12) United States Patent

Samanta et al.

(10) Patent No.: US 12,565,163 B2

(45) Date of Patent: Mar. 3, 2026

(54) HIGH VOLTAGE DISTRIBUTION MODULE FOR ELECTRIC VEHICLE

(71) Applicant: Allison Transmission, Inc., Indianapolis, IN (US)

(72) Inventors: Rajiv Samanta, London (GB); Kostas Doratis, London (GB); Xavier Jurdieu, London (GB); Maciej Pater, London (GB)

(73) Assignee: Allison Transmission, Inc., Indianapolis, IN (US)

( * ) Notice: Subject to any disclaimer, the term of this patent is extended or adjusted under 35 U.S.C. 154(b) by 261 days.

(21) Appl. No.: 18/354,899

(22) Filed: Jul. 19, 2023

(65) Prior Publication Data

US 2024/0025362 A1 Jan. 25, 2024

Related U.S. Application Data

(60) Provisional application No. 63/368,962, filed on Jul. 20, 2022.

(51) Int. Cl.

| | |
|---|---|
| *H02B 13/025* | (2006.01) |
| *B60R 16/033* | (2006.01) |
| *H02B 1/24* | (2006.01) |

(52) U.S. Cl.

CPC ......... *B60R 16/033* (2013.01); *H02B 13/025* (2013.01); *H02B 1/24* (2013.01)

(58) Field of Classification Search

CPC ........ B60R 16/033; H02B 13/025; H02B 1/24

(Continued)

(56) References Cited

U.S. PATENT DOCUMENTS 7,064,658 B2 * 6/2006 Burlak .................. B60R 16/023
                                                        340/657
9,102,267 B2 * 8/2015 Kulkarni ................ H05B 45/10

(Continued)

FOREIGN PATENT DOCUMENTS

CN        209972370 U      1/2020
CN        212148722 U     12/2020

(Continued)

OTHER PUBLICATIONS

PC, Int. App. No. PCT/US2023/028133 Search Report mailed Nov. 8, 2023, 4 pages, Nov. 8, 2023.

(Continued)

*Primary Examiner* — Tulsidas C Patel

(74) *Attorney, Agent, or Firm* — Woodard, Emhardt, Henry, Reeves & Wagner, LLP

(57) ABSTRACT

A power distribution system supplies electrical power to various parts of a vehicle. The system includes a power distribution board and ancillary expansion boards that regulate power distribution in the system. With this system, power can be routed to multiple high-current and low-current devices positioned in a variety of ways within the vehicle. The system includes high-current and low-current terminals that can be positioned in a variety of ways in the housing. The number of ancillary expansion boards in the system can be adjusted to supply power to a desired amount of low-current, ancillary devices on the vehicle. Further, one or more high-current terminals are configured to connect to a charger that sends power to the system.

14 Claims, 9 Drawing Sheets

(58) Field of Classification Search
USPC .......................................................... 439/76.2
See application file for complete search history.

(56) References Cited

U.S. PATENT DOCUMENTS

| | | | |
|---|---|---|---|
| 10,005,366 | B1 | 6/2018 | Wang et al. |
| 10,932,388 | B1 | 2/2021 | Davis et al. |
| 11,052,784 | B2 | 7/2021 | Mensch et al. |
| 2004/0189092 | A1 | 9/2004 | Burlak et al. |
| 2015/0054466 | A1 | 2/2015 | Kinomura |
| 2024/0239282 | A1* | 7/2024 | Gao ....................... H01R 13/66 |
| 2024/0300426 | A1* | 9/2024 | Salter ................... B60R 16/033 |

FOREIGN PATENT DOCUMENTS

| | | | |
|---|---|---|---|
| KR | 102139572 | B1 | 7/2020 |
| KR | 20220082333 | A | 6/2022 |

OTHER PUBLICATIONS

PC, Int. App. No. PCT/US2023/028133 Written Opinion mailed Nov. 8, 2023, 5 pages, Nov. 8, 2023.

* cited by examiner

HIGH VOLTAGE DISTRIBUTION MODULE FOR ELECTRIC VEHICLE

CROSS REFERENCE TO RELATED APPLICATIONS

This application claims the benefit of U.S. Patent Application No. 63/368,962, filed Jul. 20, 2022, which is hereby incorporated by reference.

BACKGROUND

With most vehicles, providing adequate electrical power to various vehicular components is a concern. Improper electrical power distribution may cause the vehicle to not properly operate. With the recent popularity of electric vehicles, electrical power distribution systems for such vehicles experience even more challenging demands as compared to their internal combustion engine powered counterparts.

Thus, there is a need for improvement in this field.

SUMMARY

A unique power distribution system has been developed to supply power to various components of a heavy-duty electric vehicle. The power distribution system has been designed to house connections to high- and low-current devices in the same enclosure. The placement of high- and low-current device terminals is customizable to support many device arrangements within the vehicle. By using one enclosure, the cost and size of the power distribution system can be reduced. At the same time, the customizable terminals on the enclosure support many types and configurations of components on the vehicle. This allows vehicles to utilize multiple onboard devices with varying functions while reducing the size of the power distribution system.

Inside the enclosure, a power distribution unit (PDU) regulates the distribution of power to the high- and low-current components. In one example, the PDU is a controller on a circuit board. The PDU connects directly to a single pair of high-voltage bus bars. Sensors on the bus bars monitor voltage and current and communicate with the PDU. The PDU further sends control signals to contactors on the bus bars. The bus bars carry high current that is distributed to and from the connected components. High-current terminals are connected to the bus bars to transfer power to and from the high-current components. High-current components include devices that consume or produce high currents, such as energy storage devices and drive-train inverters. For example, high-current terminals carry currents above 300 Amps (A) to an inverter that powers an electric motor. The high-current terminals further include charging interface terminals. For example, current above 500 A is supplied through the charging interface terminals to the power distribution system. The enclosure further includes ancillary expansion boards that are connected to the bus bars and the PDU. The ancillary expansion boards connect to one or more low-current terminals that transfer power to low-current components. For example, an ancillary expansion board provides currents below 100 A to four low-current terminals. The ancillary boards include fuses, contactors, current and voltage sensors, and pre-charge resistors. The number of ancillary boards and low-current terminals can be altered within the enclosure. Similarly, the placement of low- and high-current terminals on the enclosure can be configured to support various component arrangements. For example, all low- and high-current terminals can be located on one face of the enclosure to facilitate routing of power to components.

The system and techniques as described and illustrated herein concern a number of unique and inventive aspects. Some, but by no means all, of these unique aspects are summarized below.

Aspect 1 generally concerns a system.

Aspect 2 generally concerns the system of any previous aspect including a vehicle.

Aspect 3 generally concerns the system of any previous aspect in which the vehicle is an electric vehicle.

Aspect 4 generally concerns the system of any previous aspect in which the electric vehicle is a battery electric vehicle (BEV).

Aspect 5 generally concerns the system of any previous aspect in which the vehicle is a heavy-duty vehicle.

Aspect 6 generally concerns the system of any previous aspect including a vehicle control system.

Aspect 7 generally concerns the system of any previous aspect in which the vehicle control system is configured to control the vehicle.

Aspect 8 generally concerns the system of any previous aspect including an energy storage system (ESS).

Aspect 9 generally concerns the system of any previous aspect in which the ESS includes a battery.

Aspect 10 generally concerns the system of any previous aspect including a motor.

Aspect 11 generally concerns the system of any previous aspect in which the motor being an electric motor.

Aspect 12 generally concerns the system of any previous aspect including an inverter.

Aspect 13 generally concerns the system of any previous aspect in which the inverter being electrically connected to the motor.

Aspect 14 generally concerns the system of any previous aspect in which the inverter is configured to convert direct current (DC) to alternating current (AC).

Aspect 15 generally concerns the system of any previous aspect in which the inverter is configured to convert alternating current (AC) to direct current (DC).

Aspect 16 generally concerns the system of any previous aspect in which the inverter is configured to electrical power from the ESS for use in the motor.

Aspect 17 generally concerns the system of any previous aspect in which the inverter is configured to facilitate regenerative braking by the motor to charge the ESS.

Aspect 18 generally concerns the system of any previous aspect including an ancillary device.

Aspect 19 generally concerns the system of any previous aspect in which the ancillary device is a device configured to perform an ancillary function for the vehicle.

Aspect 20 generally concerns the system of any previous aspect in which the ancillary device includes a component that performs a function outside of a primary function of the vehicle.

Aspect 21 generally concerns the system of any previous aspect including a power distribution system.

Aspect 22 generally concerns the system of any previous aspect in which the power distribution system is configured to distribute electrical power within the vehicle.

Aspect 23 generally concerns the system of any previous aspect in which the power distribution system is electrically connected to the ESS.

Aspect 24 generally concerns the system of any previous aspect in which the power distribution system is configured to distribute power from the ESS.

Aspect 25 generally concerns the system of any previous aspect in which the power distribution system is electrically connected to the ancillary device.

Aspect 26 generally concerns the system of any previous aspect in which the power distribution system is configured to supply electrical power to the ancillary device.

Aspect 27 generally concerns the system of any previous aspect in which the power distribution system is electrically connected to the inverter.

Aspect 28 generally concerns the system of any previous aspect in which the power distribution system is configured to supply electrical power to the inverter.

Aspect 29 generally concerns the system of any previous aspect in which the power distribution system is configured to receive electrical power from the inverter.

Aspect 30 generally concerns the system of any previous aspect in which the power distribution system is configured to supply electrical power to the motor.

Aspect 31 generally concerns the system of any previous aspect in which the power distribution system is configured to supply electrical power from the ESS to the motor.

Aspect 32 generally concerns the system of any previous aspect in which the power distribution system is configured to receive electrical power from the motor.

Aspect 33 generally concerns the system of any previous aspect in which the power distribution system is configured to receive electrical power from the motor during regenerative braking with the motor.

Aspect 34 generally concerns the system of any previous aspect in which the power distribution system is operatively connected to the vehicle control system.

Aspect 35 generally concerns the system of any previous aspect in which the power distribution system being configured to distribute electricity for a low-current vehicular component having a low-current and a high-current vehicular component having a high-current.

Aspect 36 generally concerns the system of any previous aspect in which the power distribution system includes a low-current terminal configured to regulate the low-current for the low-current vehicular component.

Aspect 37 generally concerns the system of any previous aspect in which the power distribution system includes a high-current terminal configured to regulate the high-current for the high-current vehicular component.

Aspect 38 generally concerns the system of any previous aspect in which the low-current vehicular component includes the ancillary device.

Aspect 39 generally concerns the system of any previous aspect in which the high-current vehicular component includes the motor.

Aspect 40 generally concerns the system of any previous aspect in which the high-current vehicular component includes the inverter.

Aspect 41 generally concerns the system of any previous aspect in which the high-current vehicular component includes the ESS.

Aspect 42 generally concerns the system of any previous aspect in which the low-current is at most 100 Amps.

Aspect 43 generally concerns the system of any previous aspect in which the high-current is at least 300 Amps.

Aspect 44 generally concerns the system of any previous aspect in which the high-current is at least 500 Amps.

Aspect 45 generally concerns the system of any previous aspect in which the power distribution system includes a housing.

Aspect 46 generally concerns the system of any previous aspect in which the low-current terminal and the high-current terminal are mounted on opposite sides of the housing.

Aspect 47 generally concerns the system of any previous aspect in which the low-current terminal and the high-current terminal are mounted on the same side of the housing.

Aspect 48 generally concerns the system of any previous aspect including the vehicle having a vehicle frame.

Aspect 49 generally concerns the system of any previous aspect in which the housing has a sidewall secured to the vehicle frame.

Aspect 50 generally concerns the system of any previous aspect in which the low-current terminal and the high-current terminal are mounted on the same side of the housing that is opposite to the sidewall secured to the vehicle frame.

Aspect 51 generally concerns the system of any previous aspect in which the low-current terminal and the high-current terminal are positioned on non-overlapping areas of the housing.

Aspect 52 generally concerns the system of any previous aspect in which the high-current terminal includes a charger input terminal.

Aspect 53 generally concerns the system of any previous aspect in which the charger input terminal is configured to receive the high-current.

Aspect 54 generally concerns the system of any previous aspect in which the charger input terminal is configured to receive power to charge the ESS.

Aspect 55 generally concerns the system of any previous aspect in which the power distribution system includes a power distribution unit (PDU).

Aspect 56 generally concerns the system of any previous aspect in which the PDU includes a power distribution board.

Aspect 57 generally concerns the system of any previous aspect in which the PDU includes a controller.

Aspect 58 generally concerns the system of any previous aspect in which the PDU is configured to regulate electrical power distribution for the vehicle.

Aspect 59 generally concerns the system of any previous aspect in which the PDU is mounted in the housing.

Aspect 60 generally concerns the system of any previous aspect in which the power distribution system includes an ancillary expansion board (AEB).

Aspect 61 generally concerns the system of any previous aspect in which the PDU is configured to communicate with the AEB.

Aspect 62 generally concerns the system of any previous aspect in which the AEB is configured to regulate power flow to the ancillary device.

Aspect 63 generally concerns the system of any previous aspect in which the AEB is configured to supply power to the low-current terminal.

Aspect 64 generally concerns the system of any previous aspect in which the AEB is mounted in the housing.

Aspect 65 generally concerns the system of any previous aspect in which the AEB is electrically connected to the low-current terminal.

Aspect 66 generally concerns the system of any previous aspect in which the AEB includes a fuse that is electrically connected to the low-current terminal.

Aspect 67 generally concerns the system of any previous aspect in which the AEB includes a pre-charge resistor.

Aspect 68 generally concerns the system of any previous aspect in which the pre-charge resistor is electrically connected to the low-current terminal.

Aspect 69 generally concerns the system of any previous aspect in which the pre-charge resistor is configured to limit in-rush current during powering of the ancillary device.

Aspect 70 generally concerns the system of any previous aspect in which the AEB includes a contact.

Aspect 71 generally concerns the system of any previous aspect in which the AEB includes a voltage sensor on each side of the contact.

Aspect 72 generally concerns the system of any previous aspect in which the power distribution system includes one or more bus bars.

Aspect 73 generally concerns the system of any previous aspect in which the bus bars are configured to carry the high-current.

Aspect 74 generally concerns the system of any previous aspect in which the bus bars being configured to supply power to the high-current terminal.

Aspect 75 generally concerns the system of any previous aspect in which the bus bars are electrically connected to the high-current terminal.

Aspect 76 generally concerns the system of any previous aspect in which the contact is configured to electrically isolate the low-current terminal from the bus bars.

Aspect 77 generally concerns the system of any previous aspect in which the contact is configured to electrically isolate a charger and the bus bars.

Aspect 78 generally concerns the system of any previous aspect in which the bus bars include a positive bus and a negative bus.

Aspect 79 generally concerns the system of any previous aspect in which the bus bars are positioned along one side of the housing.

Aspect 80 generally concerns the system of any previous aspect in which the AEB is positioned along a side of the housing that is opposite the bus bars.

Aspect 81 generally concerns the system of any previous aspect in which the PDU is positioned along a side of the housing that is opposite the bus bars.

Aspect 82 generally concerns the system of any previous aspect in which the PDU is configured to measure voltage across the bus bars.

Aspect 83 generally concerns the system of any previous aspect in which the PDU is electrically connected to the bus bars.

Aspect 84 generally concerns the system of any previous aspect in which the PDU is configured to interface with a current sensor.

Aspect 85 generally concerns the system of any previous aspect in which the current sensor is configured to measure current at the high-current terminal.

Aspect 86 generally concerns the system of any previous aspect in which the current sensor is configured to measure current at the charger input terminal.

Aspect 87 generally concerns the system of any previous aspect in which the current sensor is configured to measure current at the AEB.

Aspect 88 generally concerns the system of any previous aspect in which the power distribution system includes a vehicle interface to support communication between the vehicle and the PDU.

Aspect 89 generally concerns a method.

Aspect 90 generally concerns the method of any previous aspect including assembling the power distribution system.

Aspect 91 generally concerns the method of any previous aspect including installing the power distribution system.

Aspect 92 generally concerns the method of any previous aspect including repairing the power distribution system.

Aspect 93 generally concerns the method of any previous aspect including disassembling the power distribution system.

Further forms, objects, features, aspects, benefits, advantages, and embodiments of the present invention will become apparent from a detailed description and drawings provided herewith.

DETAILED DESCRIPTION OF SELECTED EMBODIMENTS

Figure 1:
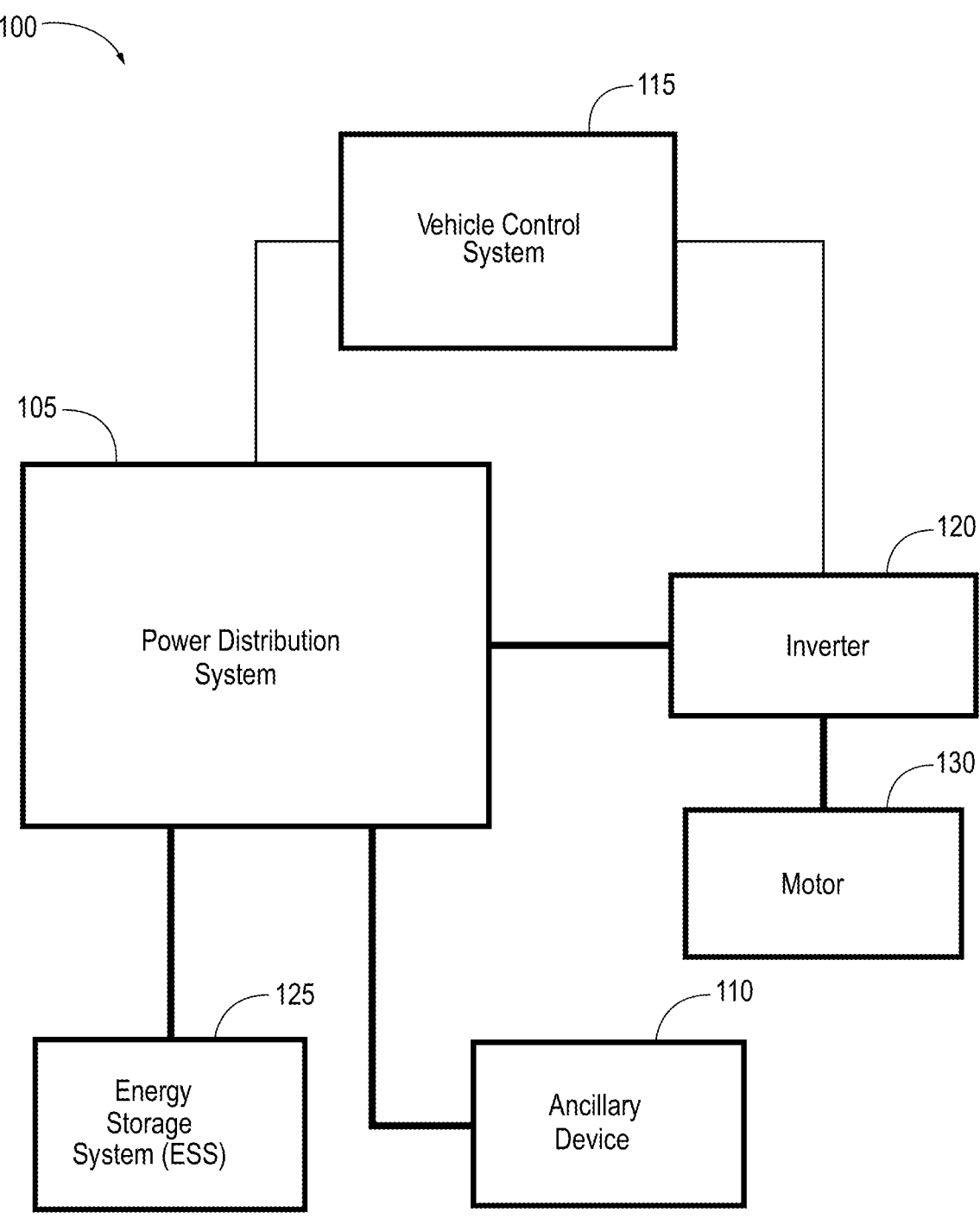
FIG. 1 is a block diagram of a vehicle according to one example.

For the purpose of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments and any further applications of the principles of the invention as described herein are contemplated as would normally occur to one skilled in the art to which the invention relates. One embodiment of the invention is shown in great detail, although it will be apparent to those skilled in the relevant art that some features that are not relevant to the present invention may not be shown for the sake of clarity.

The reference numerals in the following description have been organized to aid the reader in quickly identifying the drawings where various components are first shown. In particular, the drawing in which an element first appears is typically indicated by the left-most digit(s) in the corresponding reference number. For example, an element identified by a "100" series reference numeral will likely first appear in FIG. 1, an element identified by a "200" series reference numeral will likely first appear in FIG. 2, and so on.

FIG. 1 shows a diagrammatic view of a vehicle 100 according to one example. In one version, the vehicle 100 is in the form of a heavy-duty vehicle, such as a bus, truck, semi-tractor trailer, earthmover, and/or other types of vehicles. As shown, the vehicle 100 includes a power distribution system 105, an ancillary device 110, a vehicle control system 115, an inverter 120, an energy Storage System (ESS) 125, and a motor 130. The power distribution system 105 is electrically coupled to one or more ancillary devices 110, inverters 120, and ESS's 125. The ancillary device 110 includes one or more devices that perform one or more functions beyond movement of the vehicle. The ancillary device 110 can for example can include a power take-off (PTO) unit, an air conditioning device, or a vehicle dashboard. For instance, the ancillary device 110 can include mechanical attachments, heating and cooling systems, and/or lighting devices. The ancillary devices 110 provide additional functionality to the vehicle 100 and may allow the vehicle 100 to perform specialized tasks. The inverter 120 includes one or more power converting devices that provide power to components on a drive train. The ESS 125 includes one or more devices that store energy such as rechargeable batteries and/or hydrogen fuel cells as examples. In one example, the ESS 125 also includes equipment to convert stored energy into an electrical form and/or to convert electrical power to different types of stored energy. The electrical connections between the power distribution system 105 and the ancillary device 110, inverter 120, and ESS 125 are configured to support power to flow between one or more connected components. For example, the power distribution system 105 can supply power to one or more inverters 120 to operate devices on the drivetrain. In another example, the power distribution system 105 receives power from one or more ESS's 125 and distributes power to the rest of the vehicle 100.

As shown, the vehicle control system 115 is coupled to the power distribution system 105 and one or more inverters 120 through communication channels. The communication channel may be a controller area network (CAN) for example. Through the communication channels, the vehicle control system 115 sends or receives data, including commands, to the power distribution system 105 and inverter 120. The commands may influence the operation of the power distribution system 105 and/or inverters 120 as well as the downstream ancillary devices 110, ESS's 125, and/or motors 130. Alternatively or additionally, the vehicle control system 115 is configured to send commands based on manual or automated inputs. For example, the vehicle control system 115 may send a command to the power distribution system 105 and inverter 120 when a driver of the vehicle 100 presses an accelerator pedal.

In one form, the motor 130 is an electric motor. The motor 130 is electrically coupled to the inverter 120. The inverter 120 converts electrical power from the power distribution system 105 to electrical current that is sent to the motor 130. The electrical power current determines the operation of the motor 130. Commands from the vehicle control system 115 to the power distribution system 105 and/or inverter 120 may influence the supplied current and/or voltage. For example, a command from the vehicle control system 115 may cause a change in the current, fundamental frequency, or waveform shape of the electrical power. Alternatively or additionally, the motor 130 may transfer power to the inverter 120. That power may be subsequently transferred to the power distribution system 105 and the rest of the vehicle 100. For example, the motor 130 may generate and send power to the inverter 120 during regenerative braking. Power may then be sent to the power distribution system 105 and be used to charge the ESS 125.

Figure 2:
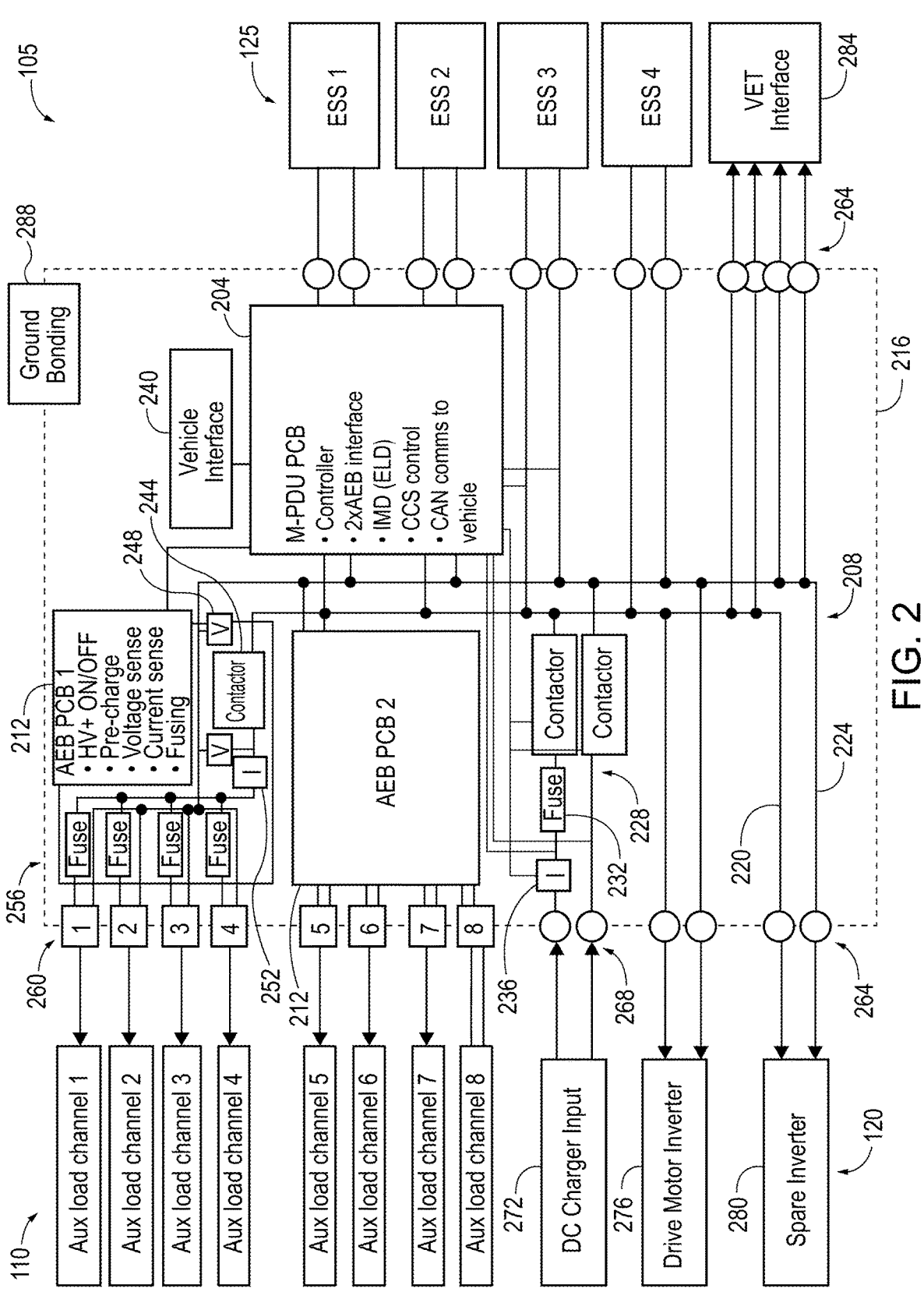
FIG. 2 is a block diagram of one version of a power distribution system that is configured to distribute electrical power in the FIG. 1 vehicle.

FIG. 2 depicts a block diagram of one embodiment of the power distribution system 105. As shown, the power distribution system 105 includes at least one power distribution unit (PDU) 204, power bus 208, ancillary expansion board (AEB) 212, housing 216, charge interface contactor 228, charge interface fuse 232, charge interface current sensor 236, and vehicle interface 240. The PDU 204 in one form is a board that includes a controller to regulate power distribution. The PDU 204 is electrically connected to the power bus 208 to monitor a voltage. The PDU 204 also includes an electronic logging device (ELD) to track the operation of the drive train. One or more AEB's 212 are communicatively connected to the PDU 204 through a wired and/or wireless connection. The PDU 204 includes controls for the charge interface contactor 228. The PDU 204 is communicatively connected to the charge interface contactor 228 to control current flow and to the charge interface current sensor 236 to monitor current. The power bus 208 includes a positive bus 220 and a negative bus 224 that are electrically coupled to the PDU 204. The PDU 204 is connected to nodes on the positive bus 220 and negative bus 224 on the other side of the charge interface contactor 228 such that the PDU 204 can monitor the voltage at the charging interface. An additional electrical connection couples the PDU 204 to the vehicle interface 240. The vehicle interface 240 facilitates communication between the vehicle 100 and the PDU 204. The communication channel between the PDU 204 and the vehicle, including the vehicle interface 240, may be CAN communication for example. As shown in the diagram, the housing 216 encloses the components of the power distribution system 105. The housing 216 provides protection from external factors and may isolate stray conduction paths. The housing 216 may be made of any solid material, such as aluminum, steel, fiberglass, and/or plastic as examples. The PDU 204, power bus 208, AEB 212, housing 216, positive bus 220, negative bus 224, charge interface contactor 228, charge interface fuse 232, charge interface current sensor 236, and vehicle interface 240 are all physically coupled to the housing 216 either directly or indirectly.

The power bus 208 includes a positive bus 220 and a negative bus 224. The positive bus 220 is distinguished by a positive voltage difference relative to the negative bus 224. The negative bus 224 is denoted as a reference bus for the positive bus 220. For example, the negative bus 224 may be electrically connected to a ground or neutral node. The positive bus 220 and negative bus 224 cannot be directly connected to the same node. In general, an electrical connection from one device to the power bus 208 refers to two connections. The connections include one connection from one terminal on the device to the positive bus 220 and one connection from another terminal on the device to the negative bus 224. The positive bus 220 and negative bus 224 are configured to carry consistently high currents. For example, the positive bus 220 and negative bus 224 may each carry a current over 500 Amps (A) during normal operation. Specifically, the positive bus 220 and negative bus 224 are configured to carry an RMS value of current that exceeds 500 A. In another example, the positive bus 220 and negative bus 224 are each configured to carry an RMS current of at least 700 A, 850 A, 1000 A, 1250 A, or 1400 A.

Branching from the power bus 208, the charge interface contactor 228, charge interface fuse 232, and charge interface current sensor 236 support the power distribution system 105 to safely connect to a charger. The charge interface contactor 228 includes one or more contactors on one or both of the positive bus 220 and the negative bus 224. The charge interface contactor 228 is configured to electrically isolate parts of the circuit at high voltages, such as voltages exceeding 500 volts (V), 700 V, and/or 1000 V as examples. In the depicted embodiment, the charge interface contactor 228 includes a contactor on each of the positive bus 220 and the negative bus 224. The charge interface contactor 228 is configured to selectively electrically connect and isolate the power bus 208 and an external charger. Alternatively or additionally, the charge interface contactor 228 can carry high-current from a charger to the power bus 208 during a charging event. The charge interface contactor 228 is configured to operate based on commands from the PDU 204. For example, the charge interface contactor 228 may receive a command to open the contacts of one or more contactors. The charge interface fuse 232 includes one or more fuses on one or both of the positive bus 220 and negative bus 224. The charge interface fuse 232 is configured to electrically isolate parts of the circuit if a current threshold has been exceeded. The charge interface current sensor 236 includes one or more sensors on one or both of the positive bus 220 and negative bus 224. The charge interface current sensor 236 is configured to send current data to the PDU 204. The controller on the PDU 204 makes decisions based on the current data from the charge interface current sensor 236. For example, the PDU 204 may send a command to the charge interface contactor 228 if the current exceeds a threshold. The positive bus 220 and negative bus 224 include branches that extend from the positive bus 220 and negative bus 224 that are electrically connected to the respective nodes of the positive bus 220 and negative bus 224. For example, the positive bus 220 and the negative bus 224 may branch and extend into the AEB 212.

Further branching from the power bus 208, the AEB 212 includes at least one ancillary contactor 244, ancillary voltage sensor 248, ancillary current sensor 252, and ancillary fuse 256. One or more AEB's 212 are electrically connected to the power bus 208. The number of ancillary contactors 244, ancillary voltage sensors 248, ancillary current sensors 252, and/or ancillary fuses 256 may vary among multiple AEB's 212. The ancillary contactor 244 includes one or more contactors electrically connected to one or both of the positive bus 220 and negative bus 224. The ancillary contactor 244 is configured to electrically isolate parts of the circuit at high voltages, such as voltages exceeding 500 V, 700 V, and/or 1000 V as examples. In the depicted embodiment, the ancillary contactor 244 includes one contactor connected to the positive bus 220. The ancillary contactor 244 can be used to electrically isolate the power bus 208 and one or more external ancillary devices 110. Communications between the AEB 212 and PDU 204 include commands for the ancillary contactor 244. The ancillary voltage sensor 248 includes one or more sensors electrically connected between the nodes of the positive bus 220 and negative bus 224. The sensors of the ancillary voltage sensor 248 measure the voltage difference between the connected nodes. As shown, the ancillary voltage sensor 248 is connected on one or more sides of the ancillary contactor 244. In one embodiment, one ancillary voltage sensor 248 is placed on each side of the ancillary contactor 244. When the one or more contactors of the ancillary contactor 244 are in an open position, one or more sensors of the ancillary voltage sensor 248 can measure voltages between different nodes. The ancillary current sensor 252 includes one or more sensors electrically connected to one or more conduction paths on the AEB 212. The sensors of the ancillary current sensor 252 measure the current flowing through the connected conduction path. In one embodiment, the ancillary current sensor 252 is electrically connected to the positive bus 220 to measure current flow. The ancillary voltage sensor 248 and the ancillary current sensor 252 are configured to communicate data about the voltages and currents in the AEB 212 to the PDU 204. The PDU 204 is configured to utilize the communicated data to determine commands. In the illustrated embodiment, the positive bus 220 and negative bus 224 split into multiple branches on the AEB 212. The number of branches may correspond to the number of external ancillary devices 110 that are connected to the AEB 212. The ancillary fuse 256 includes one or more electrical fuses electrically connected to one or more branches of the positive bus 220 and/or negative bus 224. The ancillary current sensors 252 are configured to electrically isolate parts of the circuit if the current exceeds a threshold.

Extending from the AEB 212, one or more low-current terminals 260 are electrically connected to one or more branches of the positive bus 220 and negative bus 224. Each low-current terminal 260 supports electrical power flow between one or more ancillary devices 110 and the AEB 212. The low-current terminals 260 attach to the ancillary devices 110 through cables, wires, busbars, and/or other types of electrically conductive connections. To physically secure the terminals, the low-current terminals 260 are mounted to the housing 216. The positions of the low-current terminals 260 are customizable across the surface of the housing 216. For example, all the low-current terminals 260 can be placed on one face of the housing 216. The low-current terminals 260 are denoted as supporting current flow below a certain threshold. In one embodiment, the low-current terminals 260 support currents up to 100 A. Specifically, the low-current terminals 260 are configured to support an RMS current value up to 100 A.

Extending from the power bus 208, one or more high-current terminals 264 are electrically connected to the positive bus 220 and negative bus 224. The high-current terminals 264 support electrical power flow between the power distribution system 105 and one or more high-current components including the inverters 120 and ESS's 125. The high-current terminals 264 attach to the high-current components through cables, wires, busbars, and/or other types of electrically conductive connections. Each high-current terminal 264 includes one or more terminals. In one embodiment, one high-current terminal 264 includes a terminal connected to the positive bus 220 and a terminal connected to the negative bus 224. To physically secure the terminals, the high-current terminals 264 are mounted to the housing 216. The positions of the high-current terminals 264 are customizable across the surface of the housing 216. For example, all the high-current terminals 264 can be placed on one face of the housing 216. In another example, the high-current terminals 264 are placed on a face that does not include any low-current terminals 260. The high-current terminals 264 are denoted as supporting current flow above a certain threshold. In one embodiment, all the high-current terminals 264 support currents above 300 A. In other embodiments, the current threshold is 350 A, 400 A, or 500 A. The high-current terminals 264 includes a charge terminal 268. The charge terminal 268 includes one or more terminals that are connected to the power bus 208 through the charge interface contactor 228, charge interface fuse 232, and charge interface current sensor 236. The charge terminal 268 supports power flow between a charger input 272 and the power distribution system 105. The charger input 272 can be an electrical connection to an external power source or distribution system. The charge terminal 268 and the charger input 272 support fast charging by allowing high current into the power distribution system 105. For example, the charger input 272 and charge terminal 268 support currents over 500 A during charging. Alternatively or additionally, power may flow from the power distribution system 105 to the charger input 272 in certain embodiments.

Connected to the high-current terminals 264, the inverter 120 includes at least one drive motor inverter 276 and spare inverter 280. The drive motor inverter 276 includes one or more power converting devices that supply power to the motor 130. The spare inverter 280 includes one or more power converting devices that supply power to the same motor and/or a spare motor of the motor 130. Alternatively or additionally, power may flow from the motor 130 to the power distribution system 105 through the drive motor inverter 276 and spare inverter 280. In one example, the inverter 120 is configured such that the drive motor inverter 276 operates under normal conditions. The inverter 120 may further be configured such that the spare inverter 280 only operates when the drive motor inverter 276 and/or the motor 130 is malfunctioning. As extensions of the motor 130, the drive motor inverter 276 and spare inverter 280 communicate with the vehicle control system 115. An additional high current component includes a vehicle environmental testing interface 284. The vehicle environmental testing interface 284 is used for conducting testing to assess performance of the vehicle in various environments. The vehicle environmental testing interface 284 includes external controls and devices that facilitate testing. Power is allowed to flow from the power distribution system 105 to the vehicle environmental testing interface 284 and vice versa. The housing 216 additionally connects to a ground bonding 288 that electrically grounds the housing 216. The ground bonding 288 includes one or more studs and/or bolts that physically and electrically couple the housing 216 to an electrically grounded object outside of the housing 216.

The PDU 204 is configured to control the power flow among components connected to the power distribution system 105. By monitoring the positive bus 220 and negative bus 224 and communicating with the AEB 212 and vehicle interface 240, the PDU 204 can determine controls for components of the power distribution system 105 to electrically connect various parts of the power distribution system 105. The power distribution system 105 supports safe charging through the charge interface contactor 228, charge interface fuse 232, and charge interface current sensor 236. The charging interface components are used to regulate and safely perform charging of the ESS 125 through the power bus 208. The power distribution system 105 includes one or more AEB's 212 to support the power transfer to the ancillary device 110. The AEB 212 includes the ancillary contactor 244, ancillary voltage sensor 248, ancillary current sensor 252, and ancillary fuse 256 to regulate power transfer between the ancillary device 110 and the power distribution system 105. The AEB 212 is configured to transfer power at a low current below 100 A to one or more connected low-current terminals 260. Attached to the power bus 208, the high-current terminals 264 are configured to transfer power at a high current above 300 A to one or more connected components. The high-current terminals 264 includes the charge terminal 268. The charge terminal 268 supports power flow at a high current above 500 A between the charger input 272 and the charging interface. The inverter 120 and ESS 125 also transfer power through the high-current terminals 264. The inverter 120 includes at least one drive motor inverter 276 and spare inverter 280. The high-current terminals 264 further connect to the vehicle environmental testing interface 284 for vehicle testing. To electrically ground the power distribution system 105, the ground bonding 288 mechanically and electrically attaches to the housing 216.

Figure 3:
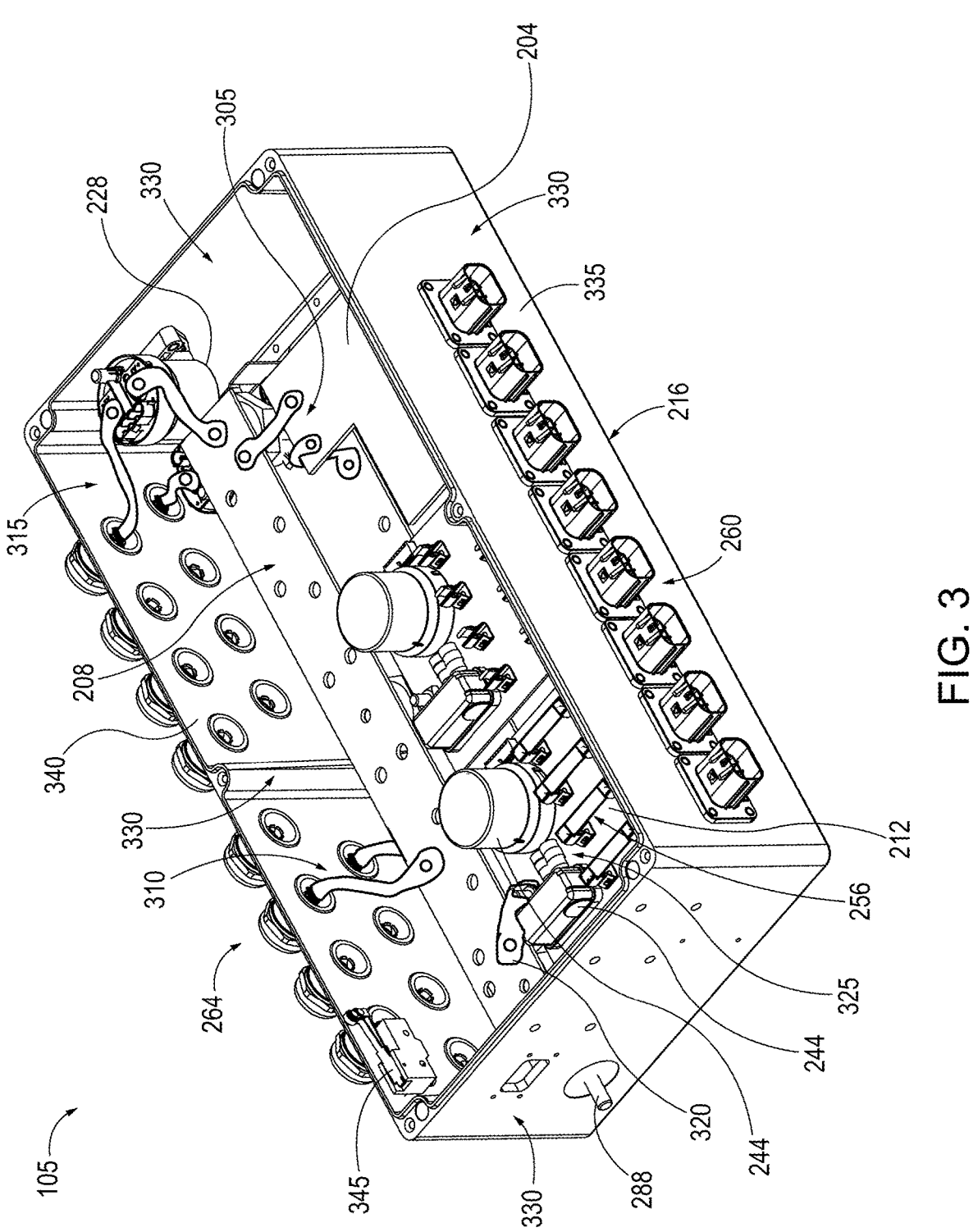
FIG. 3 is a perspective view of the FIG. 2 power distribution system.

FIG. 3 depicts a perspective view of one embodiment of the power distribution system 105. As shown, the PDU 204 is electrically connected to the positive bus 220 and the negative bus 224 by two PDU bus connectors 305. The PDU bus connectors 305 include cables, wire, busbars, and/or other types of electrically conductive connections. In one embodiment, the PDU bus connectors 305 are cables that are fastened to electrically conductive points on the PDU 204 and the respective positive bus 220 and negative bus 224. The PDU bus connectors 305 allow power to transfer to the PDU 204 as well as allow voltage monitoring by the PDU 204. Also shown, a pair of high-current terminals 264 are electrically connected to the positive bus 220 and negative bus 224 by two high-current terminal connectors 310. The high-current terminal connectors 310 include one or more connections between one or more pairs of high-current terminals 264 and the respective positive bus 220 and negative bus 224. The high-current terminal connectors 310 provide an electrical path suitable for carrying high currents and transferring power. The high-current terminal connectors 310 include cables, wires, busbars, and/or other types of electrical conductors. In one embodiment, the high-current terminal connectors 310 are cables that are fastened to electrically conductive points on a pair of high-current terminals 264 and the respective positive bus 220 and negative bus 224. In the charging interface, the charge terminals 268 are electrically connected to one or more charge interface contactors 228 by one or more charge interface connectors 315. The charge interface contactors 228 are then electrically connected to the positive bus 220 and negative bus 224 by one or more additional charge interface connectors 315. The charge interface connectors 315 include cables, wires, busbars, and/or other types of electrically conductive connections. The charge interface connectors 315 are further configured to support high current and to transfer power. In one embodiment, there is one charge interface contactor 228 on the positive bus 220, and the charge interface connector 315 connects directly to from a charge terminal 268 to the negative bus 224. In another embodiment, there is one charge interface contactor 228 on the negative bus 224, and the charge interface connector 315 connects directly from a charge terminal 268 to the positive bus 220. In the shown embodiment, the charge interface connectors 315 are cables that are fastened to electrically conductive points on the respective connected parts.

In the shown embodiment, the housing 216 includes two AEB's 212. As should be appreciated, the number of AEB's 212 can vary in the power distribution system 105 based on the number of ancillary devices 110, the size of the housing 216, and/or other factors. Each AEB 212 is electrically connected to the positive bus 220 and negative bus 224 by two or more AEB bus connections 320. The AEB bus connections 320 are suited to carry the combined current transferred through one or more low-current terminals 260. The AEB bus connections 320 include cables, wire, busbars, and/or other types of electrically conductive connections. In this embodiment, the AEB bus connections 320 are cables that are fastened to electrically conductive points on the AEB 212, positive bus 220, and negative bus 224. The AEB 212 includes at least one ancillary contactor 244, ancillary fuse 256, and pre-charge resistor 325. In one example, the ancillary contactor 244 includes two contactor devices. In the same example, the AEB 212 is connected to four low-current terminals 260 and includes at least one ancillary fuse 256 and pre-charge resistor 325 per low-current terminal 260. In an alternate example, the AEB 212 is connected to one low-current terminal 260. The pre-charge resistor 325 is electrically connected to at least one low-current terminal 260. The pre-charge resistor 325 limits in-rush current during powering-on of an ancillary device 110 that is connected to the low-current terminal 260.

In the depicted embodiment, the housing 216 is a cuboidal box that includes multiple sidewalls 330. The sidewalls 330 in one version are solid panels that are attached together, and in another versions, the housing 216 is manufactured as a unitary component through injection molding plastic. In one embodiment, the housing 216 is integrally formed such that the sidewalls 330 are part of a continuous structure. In another embodiment, the sidewalls 330 are fastened or fused together to form the housing 216. In yet another embodiment, one or more sidewalls 330 are curved. In the illustrated embodiment, the sidewalls 330 include a low-current wall 335 and a high-current wall 340. The low-current wall 335 defines openings for the low-current terminals 260 and is configured to mechanically couple to the low-current terminals 260. The high-current wall 340 defines openings for the high-current terminals 264 and is configured to mechanically couple to the high-current terminals 264. The low-current wall 335 and the high-current wall 340 support a variety of positions for the openings such as to support a variety of arrangements for the low-current terminals 260 and high-current terminals 264. In the depicted embodiment, the AEB's 212 are oriented near the low-current wall 335 and all the low-current terminals 260 are placed on the low-current wall 335. The orientation and positioning of the AEB 212 and the low-current terminal 260 can be altered to allow different configurations. For example, one AEB 212 can be placed near the low-current wall 335 and another near the high-current wall 340 such that each AEB 212 routes to low-current terminals 260 placed on the respective low-current wall 335 and high-current wall 340. As should be appreciated, the low-current terminals 260 and high-current terminals 264 can be positioned on any of the sidewalls 330 and in any combination. The components of the power distribution system 105 can be positioned near any of the sidewalls 330 within the housing 216. Further, the housing 216 can be a variety of shapes that include a different number and arrangements of the sidewalls 330.

The housing 216 in one variation further includes a lid to fully enclose the power distribution system 105. A housing safety switch 345 is physically attached to the housing 216 to monitor that the lid of the housing 216 is fully secured. For example, the housing safety switch 345 may check whether a lid on the housing 216 is closed. The housing safety switch 345 is electrically connected to the PDU 204. In some cases, the PDU 204 is configured to change the operation of some parts of the power distribution system 105 based on a signal from the housing safety switch 345. For example, the PDU 204 may open a contactor when the housing safety switch 345 senses that a lid on the housing 216 is open. The housing safety switch 345 includes one or more sensors such as electrical switches. In one variation, the sensor includes a mechanical arm that is pushed into place by a closed lid for example.

Figure 4:
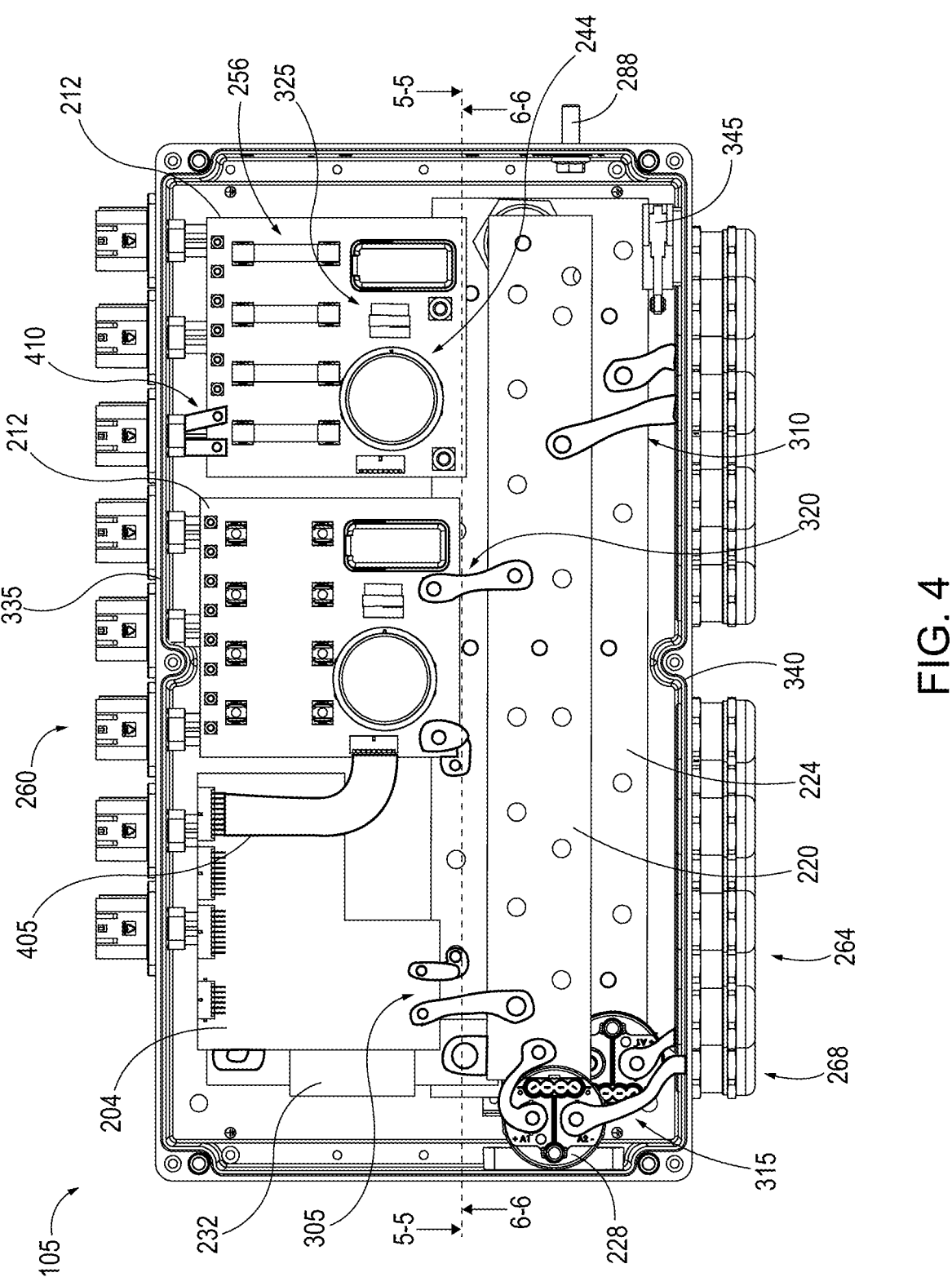
FIG. 4 is a top view of the FIG. 2 power distribution system.

FIG. 4 depicts a top view of one embodiment of the power distribution system 105. As shown, the PDU 204 is electrically connected to the AEB 212 by a PDU to AEB connector 405. The PDU to AEB connector 405 supports communication between the PDU 204 and AEB 212. In one example, the communication includes information about the voltage and current on the AEB 212 and commands to the ancillary contactor 244. The PDU to AEB connector 405 includes one or more cables, wires, busbars, and/or other electrical conductors. In the shown embodiment, the PDU to AEB connector 405 is a ribbon cable connected between terminals on the PDU 204 and the AEB 212. The AEB 212 is also electrically connected to the positive bus 220 and the negative bus 224 through a high-current wall 340 and at least one AEB terminal connector 410. The high-current wall 340 and AEB terminal connector 410 support power transfer to and from the AEB 212.

Extending from the AEB 212, at least one AEB terminal connector 410 couples to at least one low-current terminal 260. One or more AEB terminal connectors 410 electrically connect to one or more nodes on the low-current terminal 260. In one embodiment, the low-current terminal 260 includes both a positive and negative node. In another embodiment, the low-current terminal 260 includes one node that is either positive or negative. At least one AEB terminal connector 410 connects to each node on a low-current terminal 260 that is configured to transfer electrical power. The AEB terminal connectors 410 include one or more cables, wires, busbars, and/or other electrical conductors. In the illustrated embodiment, the AEB terminal connectors 410 are cables that attach to electrically conductive points on the AEB 212 and the low-current terminal 260.

With continued reference to FIG. 4, the charge interface fuse 232 is electrically connected to the charge interface contactor 228 and the negative bus 224 by one or more charge interface connectors 315. One or more charge interface contactors 228 electrically connect two or more nodes between the charge terminal 268, the charge interface contactor 228, and one of the positive bus 220 and negative bus 224.

Figure 5:
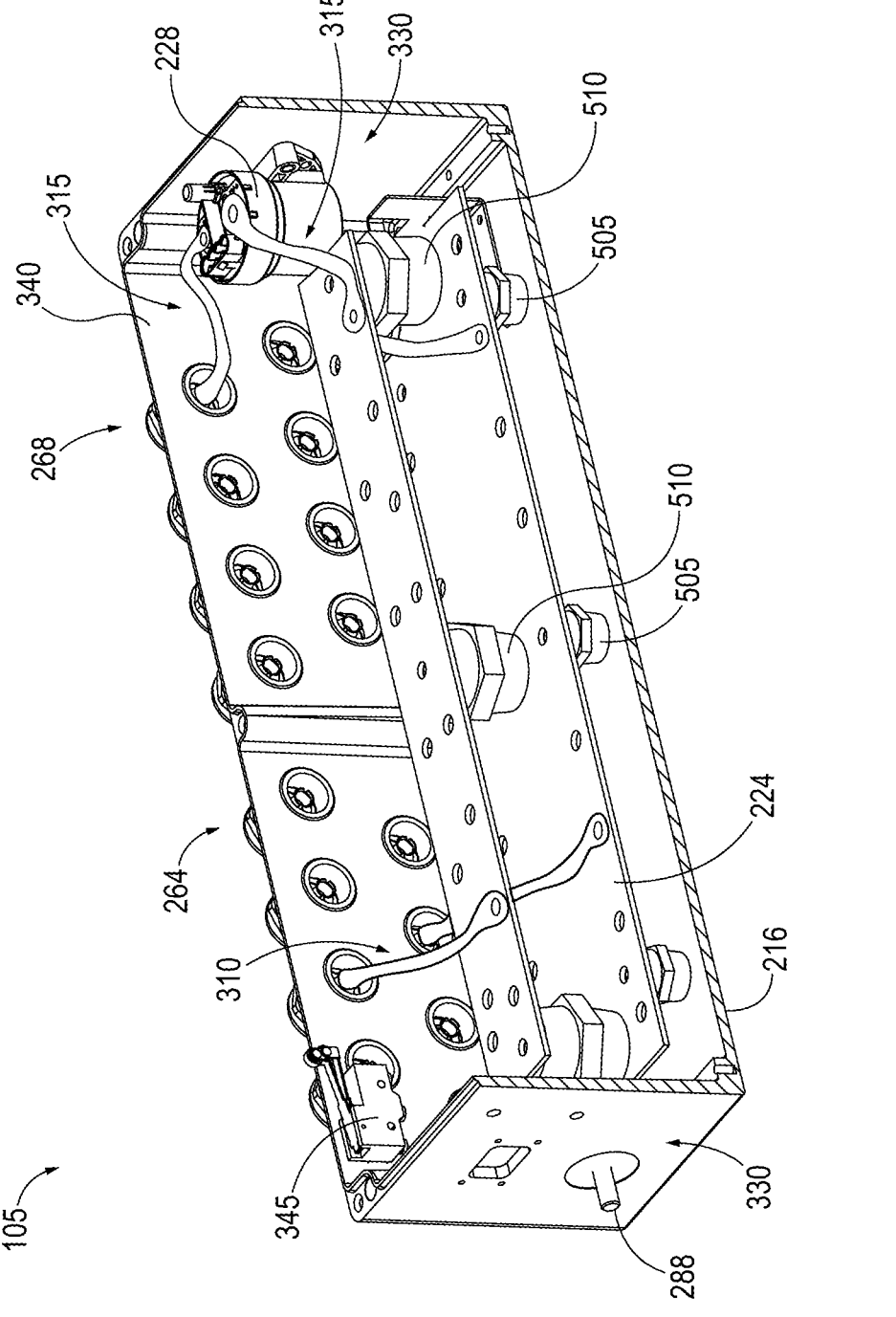
FIG. 5 is a cross-sectional perspective view of the FIG. 2 power distribution system as taken along line 5-5 in FIG. 4.

FIG. 5 depicts a perspective cross-sectional view of the power distribution system 105 taken along line 5-5 in FIG. 4. In the depicted example, all the high-current terminals 264 are arranged on one side of the housing 216. In the illustrated embodiment, the positive bus 220 and negative bus 224 are stacked in a vertical direction relative to the housing 216 so as to overlap or face one another. By being stacked in a vertical direction inside the housing 216, the positive bus 220 and negative bus 224 reduce the footprint of components in the housing 216. The positive bus 220 and the negative bus 224 in other variations can be stacked in other orientations. For example, the positive bus 220 and the negative bus 224 in one form are stacked in a horizontal direction relative to the housing 216. One or more negative bus standoffs 505 structurally support and electrically isolate the negative bus 224 from the housing 216. The negative bus standoffs 505 are mechanically coupled to the negative bus 224 and housing 216 on either end. One or more positive bus standoffs 510 then structurally support and electrically isolate the positive bus 220 from the negative bus 224. The positive bus standoffs 510 are mechanically coupled to the positive bus 220 and negative bus 224 on either end. The negative bus standoffs 505 and positive bus standoffs 510 are composed of at least one solid and electrically insulating material, such as ceramic or reinforced plastic. Alternatively or additionally, the positive bus standoffs 510 can be mechanically coupled to the positive bus 220 and the housing 216 to provide support and electrical isolation. The orientation and positioning of the positive bus 220 and negative bus 224 can be altered. In one example, the positive bus 220 is mechanically coupled to the low-current wall 335 and the negative bus 224 is mechanically coupled to the high-current wall 340. Alternatively or additionally, the positive bus 220 and negative bus 224 can be mechanically coupled to any one the faces of the housing 216. The high-current terminals 264 can be placed on the same faces as the positive bus 220 and negative bus 224. The placement of the high-current terminals 264 can be independent of the placement of the positive bus 220 and negative bus 224. If one or more high-current terminals 264 are separated from the positive bus 220 and negative bus 224 in different positions, one or more high-current terminal connectors 310 can route power between the high-current terminals 264 and the positive bus 220 or negative bus 224. In another embodiment, the housing 216 is designed to accommodate a specific orientation of the positive bus 220 and negative bus 224. For example, the positive bus 220 and negative bus 224 extend lengthwise in a horizontal direction and are stacked vertically. In this example, the housing 216 is configured to fit the placement of the positive bus 220 and negative bus 224 and the connections to the PDU 204, AEB 212, and high-current terminal 264.

Figure 6:
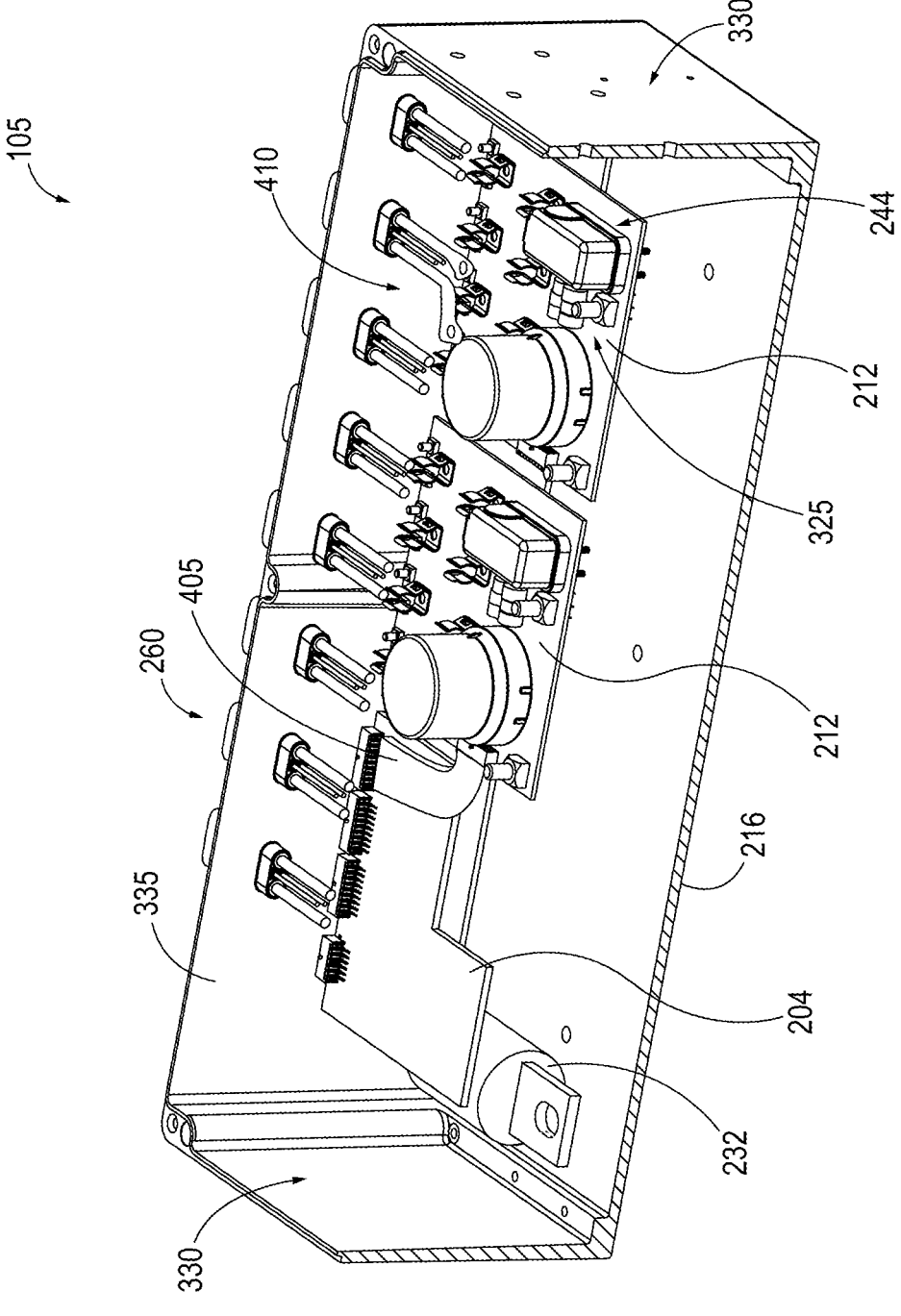
FIG. 6 is a cross-sectional perspective view of the FIG. 2 power distribution system as taken along line 6-6 in FIG. 4.

FIG. 6 depicts a perspective cross-sectional view of the power distribution system 105 taken along line 6-6 in FIG. 4. The view shown in FIG. 6 is opposite to the view of FIG. 5. In the illustrated embodiment, the PDU 204 and AEB's 212 are positioned along the low-current wall 335. Further, the low-current terminals 260 are also positioned only on the low-current wall 335. In another embodiment, the low-current terminals 260 are placed on more than one face or sidewall 330 of the housing 216. For example, the low-current terminals 260 in one form are placed on both the low-current wall 335 and the high-current wall 340.

In another embodiment, the PDU's 204 and the AEB's 212 are placed near different faces or sidewalls 330 of the housing 216. For instance, the PDU's 204 in one variation are placed along the low-current wall 335, and the AEB's 212 are placed along the high-current wall 340. In another variation, the PDU's 204 are positioned proximal to the high-current wall 340, and the AEB's 212 are positioned proximal to the low-current wall 335.

In the illustrated embodiment, the low-current terminals 260 are placed on the same face or sidewall 330 where the AEB 212 is secured (i.e., the low-current wall 335). In still yet another embodiment, the low-current terminals 260 are placed on a face or sidewall 330 that is different from where the AEB 212 is secured. For example, when the AEB 212 is placed along the low-current wall 335, the low-current terminal 260 that is connected to the AEB 212 is positioned on the high-current wall 340. As another example, when the AEB 212 is placed along the high-current wall 340, the low-current terminal 260 that is connected to the AEB 212 is positioned on the low-current wall 335. It should be recognized that the power distribution system 105 facilitates the customization of positions for the PDU's 204, AEB's 212, and low-current terminals 260.

Figure 7:
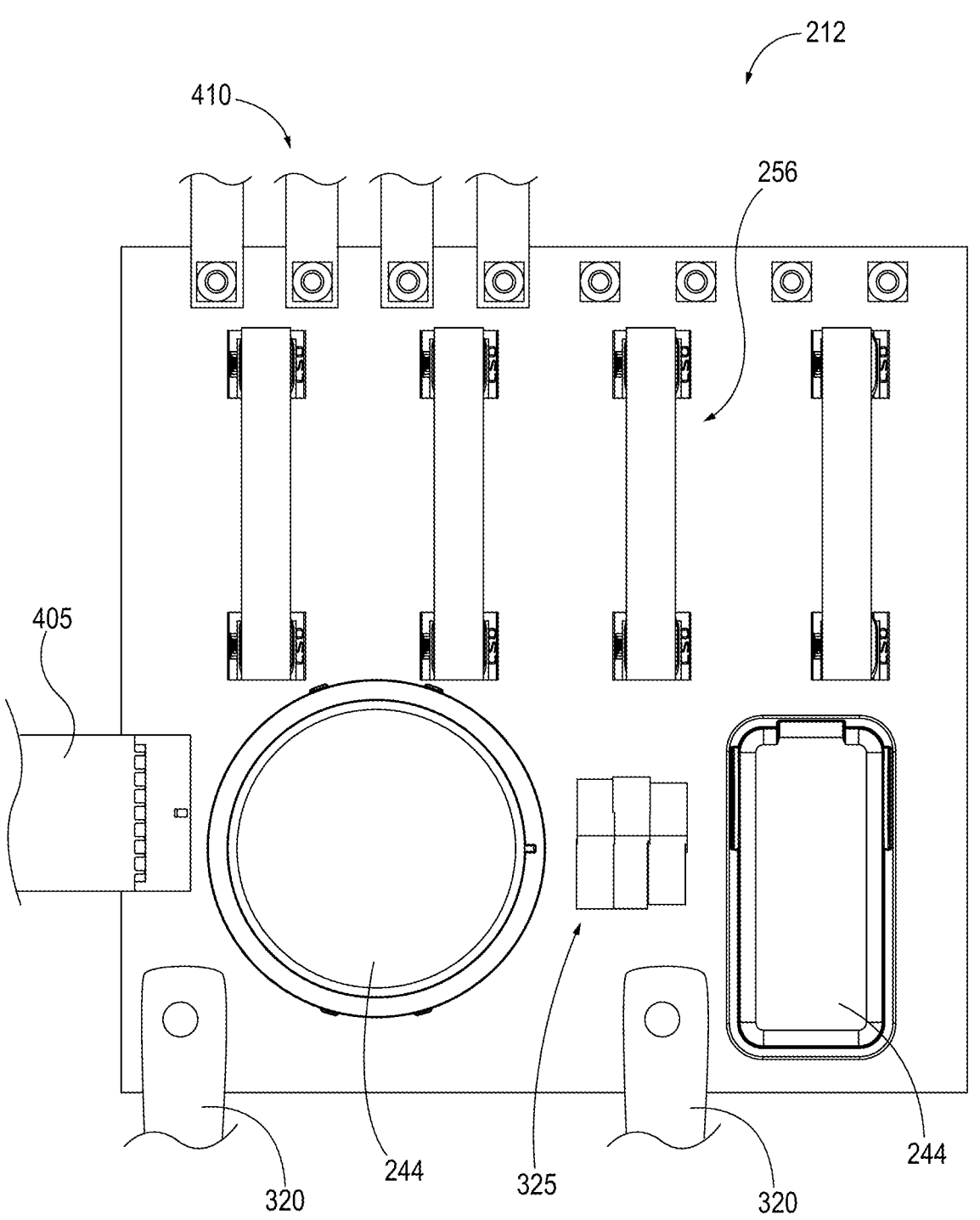
FIG. 7 is an enlarged top view of an ancillary expansion board ("AEB") when installed in the FIG. 2 power distribution system.

FIG. 7 shows an enlarged top view of one example of the AEB 212. As shown, the AEB 212 includes the ancillary contactor 244, the ancillary fuses 256, and the pre-charge resistor 325. The AEB 212 electrically connects to other components through the high-current wall 340, the PDU to AEB connector 405, and the AEB terminal connector 410. In one embodiment, the AEB 212 includes the ancillary voltage sensors 248 and ancillary current sensors 252. In another embodiment, the ancillary voltage sensor 248 and the ancillary current sensor 252 are integrated with the PDU 204, and the PDU to AEB connector 405 provides electrical pathways to monitor current and voltage on the AEB 212. It should be recognized that the placement and number of components on the AEB 212 can be altered in other variations. In the illustrated example, there are two ancillary contactors 244, four ancillary fuses 256, and six housing safety switches 345. In other examples, the number of ancillary contactors 244, ancillary fuses 256, and housing safety switches 345 corresponds directly to the number of pairs for the AEB terminal connectors 410. In other examples, there is no correspondence between the number of ancillary contactors 244, ancillary fuses 256, and housing safety switches 345 and the AEB terminal connectors 410. If there are multiple AEB's 212, the arrangement of components on each AEB 212 can vary. The arrangement of components on each AEB 212 can be adjusted based on the number of ancillary devices 110 that connect to each AEB 212.

Figure 8:
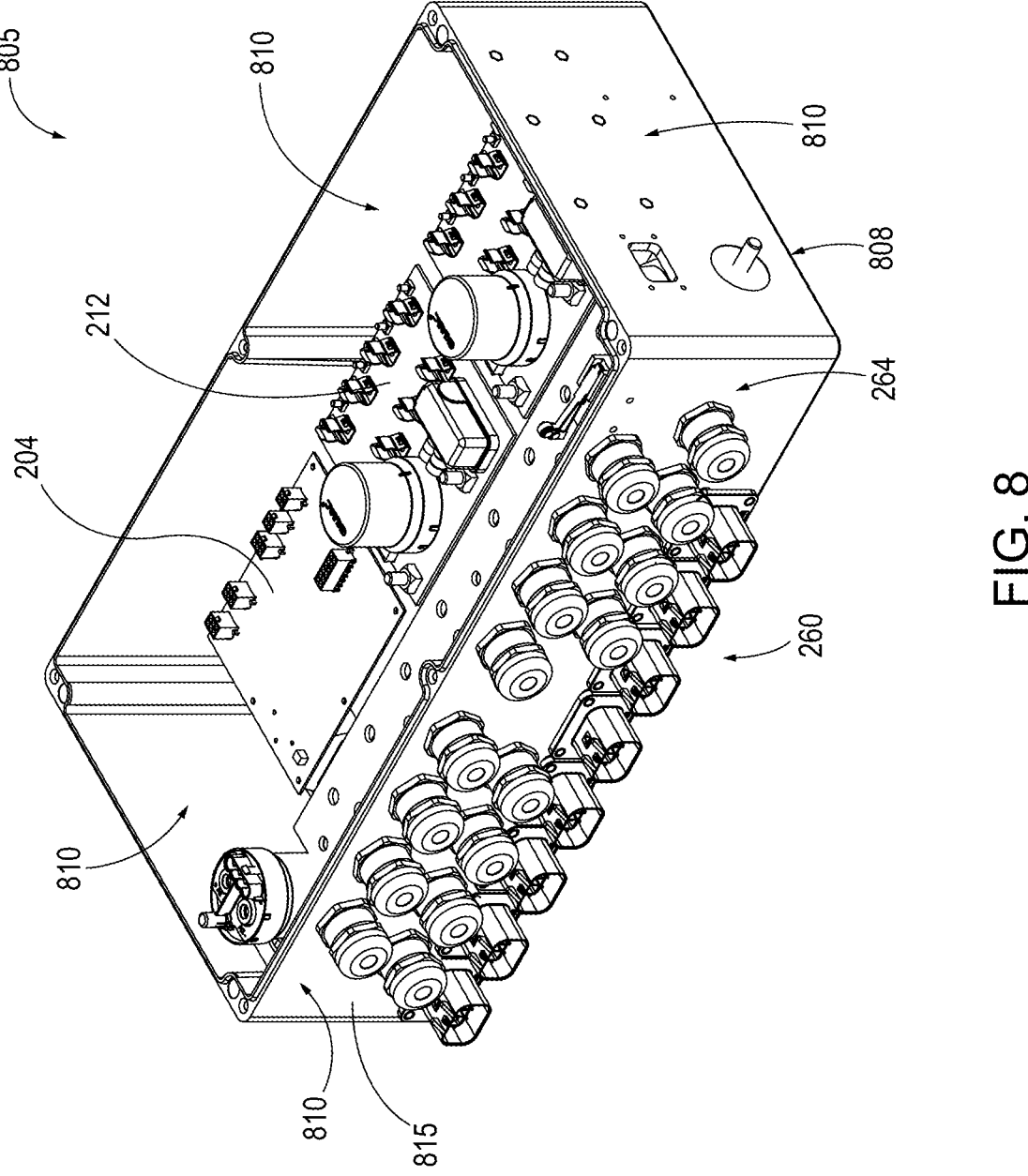
FIG. 8 is a perspective view of another version of a power distribution system that is configured to distribute electrical power in the FIG. 1 vehicle.

FIG. 8 depicts a power distribution system 805 according to another embodiment. The FIG. 8 power distribution system 805 shares components in common with and is generally configured in a fashion similar to the FIG. 3 power distribution system 105. For example, the FIG. 8 power distribution system 805 includes the PDU 204, the power bus 208, the AEB 212, the low-current terminal 260, and the high-current terminal 264 of the type described before with respect to FIGS. 2-7. The components of the FIG. 8 power distribution system 805 are operatively connected in the same manner as the power distribution system 105 illustrated in FIG. 2. The FIG. 8 power distribution system 805 further generally operates in a fashion similar to the FIG. 3 power distribution system 105. For the sake of clarity as well as brevity, these common components and functions will not be again described in great detail, but please refer to the previous discussion. Generally, only the distinctions between the designs will be discussed below.

In the FIG. 3 power distribution system 105, the low-current terminals 260 and high-current terminals 264 are located on opposite sides of the housing 216. In the FIG. 8 power distribution system 805, the low-current terminals 260 and high-current terminals 264 are located on the same side. Like before, the power distribution system 805 includes a housing 808 with one or more sidewalls 810. In the illustrated example, the housing 808 has a box shape. The sidewalls 810 are solid panels that form the housing 808. The sidewalls 810 include a terminal wall 815 that defines openings that accommodate one or more low-current terminals 260 and high-current terminals 264. The terminal wall 815 supports a variety of positions for the openings such that the power distribution system 805 can support a variety of desired terminal arrangements.

In the illustrated example, the low-current terminals 260 and high-current terminals 264 are placed in distinct sections of the terminal wall 815. The low-current terminals 260 and high-current terminals 264 are arranged in rows and columns. As shown, the high-current terminals 264 are all placed in an upper section (i.e., proximal to the opening of the housing 808) and the low-current terminals 260 in a lower section of the terminal wall 815 (i.e., proximal to the floor of the housing 808). Alternatively or additionally, all the low-current terminals 260 can be placed in a section located to the lateral side of the high-current terminals 264 (e.g., left or right). In another embodiment, the positions of one or more low-current terminals 260 and high-current terminals 264 are interspersed on one of the sidewalls 810. For example, one or more low-current terminals 260 can be placed between multiple high-current terminals 264 on one sidewall 810. In yet another embodiment, the low-current terminals 260 and high-current terminals 264 are placed on more than one shared face. For example, at least one low-current terminal 260 and high-current terminal 264 are placed on multiple sidewalls 810. As should be appreciated, the low-current terminals 260 and high-current terminals 264 can be positioned on any of the sidewalls 810 and in any combination.

In the FIG. 8 example, the AEB's 212 are positioned on a sidewall 810 that is opposite the terminal wall 815 with the low-current terminals 260. Again, the position of the internal components of the power distribution system 805 can be varied to support a variety of arrangements. In some cases, the position of the components is based on the location of the low-current terminals 260 and high-current terminals 264. Further, the locations of the low-current terminals 260 and high-current terminals 264 can be determined by the locations of the ancillary devices 110, inverters 120, ESS's 125, and/or other devices on the vehicle 100. As should be appreciated, the components of the power distribution system 805 can be arranged in a variety of ways within the housing 808 and can be electrically connected to the low-current terminals 260 and/or high-current terminals 264 in a variety of ways.

Figure 9:
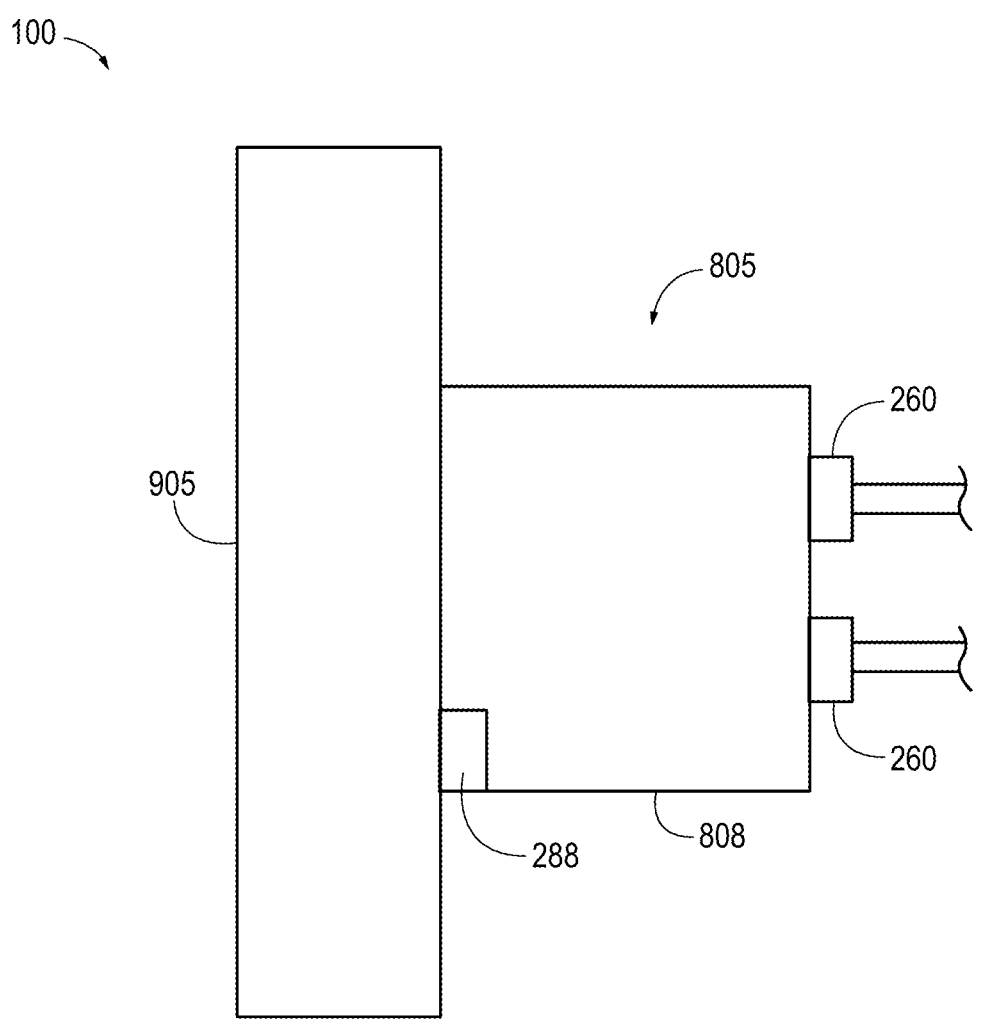
FIG. 9 is a side view of the FIG. 8 power distribution system secured to a vehicle frame of the FIG. 1 vehicle.

FIG. 9 depicts one embodiment of the FIG. 8 power distribution system 805 mounted to a vehicle frame 905 of the vehicle 100. The vehicle frame 905 is configured to support all or part of the vehicle 100. The vehicle frame 905 includes a structure of solid material, such as steel, aluminum, and/or fiberglass as examples. To physically secure the power distribution system 805, the vehicle frame 905 mechanically couples to the housing 216 using one or more fasteners, adhesive, and/or harnesses as examples.

In the illustrated embodiment, the housing 216 is attached to the vehicle frame 905 on one side and the low-current terminals 260 and high-current terminals 264 are placed on a different side. For example, the terminal wall 815 can be positioned against the vehicle frame 905, and the low-current terminals 260 and high-current terminals 264 are positioned on the terminal wall 815 that is opposite to the vehicle frame 905, as is illustrated in FIG. 8. This configuration of the power distribution system 805 facilitates connections to the low-current terminals 260 and high-current terminals 264 even when space is limited inside the vehicle 100. This configuration may further facilitate routing power to components in a certain arrangement outside the power distribution system 805. In an alternate embodiment, the housing 216 is attached to the vehicle frame 905 on one or more different sides, and the low-current terminal 260 and high-current terminal 264 are placed on one or more unattached sides. For example, the high-current wall 340 can be positioned against the vehicle frame 905 and the low-current terminal 260 and high-current terminal 264 can be positioned on the sidewall 330 and low-current wall 335 respectively, as illustrated in FIG. 3. As should be appreciated, the power distribution system 805 can be arranged in a variety of ways to couple to the vehicle frame 905, for example in the form shown in FIG. 3, in the form shown in FIG. 8, and/or other forms. Further, as noted previously, the arrangement of the low-current terminals 260 and high-current terminals 264 can be varied and can be determined based on the placement of the ancillary devices 110, inverters 120, ESS's 125, and/or other components on the vehicle 100.

A technique of assembling the power distribution system 105 will be described with reference to FIGS. 2-8. It should be recognized that the FIG. 8 power distribution system 805 can be assembled using the same technique. For the sake of clarity, this technique will be described with reference to the FIG. 3 power distribution system 105. The assembly technique may be performed by manually a human, automatically by a machine, or via a combination thereof. The assembly of the housing 216 includes any combination of the sidewalls 330 shown in FIGS. 2-6 or of the sidewalls 810 shown in FIG. 8. In one example, the housing 216 is molded from one piece of material into a shape having one or more panels. In another example, the housing 216 is formed from multiple separate panels that are fastened together using bolts, adhesive, and/or welding as examples. In another example, the technique includes machining and/or molding additional openings into the panels of the housing 216. The added openings correspond to a desired number and placement of the low-current terminals 260 and high-current terminals 264. In one embodiment, the holes are machined in individual panels before the housing 216 is formed.

The technique also includes assembling and installing the PDU 204, power bus 208, and AEB 212. In one embodiment, the PDU 204, power bus 208, and AEB 212 are assembled before being installed in the housing 216. Alternatively, the PDU 204, power bus 208, and AEB 212 can be assembled within the housing 216. In one form, the PDU 204, power bus 208, and/or AEB 212 are electrically and mechanically connected to each other through a single mechanism. For example, one dock on the AEB 212 provides an electrical and mechanical connection to the power bus 208 such that the AEB 212 can be connected to the power bus 208 through a single motion. Further, the PDU 204, power bus 208, and/or AEB 212 mechanically connect to the housing 216 through a single mechanism. For example, the power bus 208 can snap onto the housing 216 using one or more negative bus standoffs 505 and positive bus standoffs 510 that are integrated with the housing 216. Further, the low-current terminals 260 or high-current terminals 264 may mechanically and electrically connect to the housing 216 and the respective AEB 212 or power bus 208 through a single motion. For example, the low-current terminals 260 may snap into a mechanically and electrically secured position on both the housing 216 and AEB 212 through a single motion. The one or more PDU bus connectors 305, high-current terminal connectors 310, charge interface connectors 315, AEB bus connections 320, PDU to AEB connectors 405, and AEB terminal connectors 410 can be integrated into one of the corresponding components. For example, the low-current terminal 260 can incorporate the AEB terminal connector 410 that connects mechanically and electrically to the AEB 212 and housing 216. In an alternate embodiment, the connectors are attached separately. For example, the PDU 204, power bus 208, AEB 212, low-current terminal 260, and high-current terminal 264 can be mechanically attached to the housing 216 and/or to each other such that the connectors are electrically and mechanically coupled.

During the assembly, the PDU 204 and one or more AEB's 212 can be placed in a variety of positions within the housing 216. In one example, the PDU 204 and AEB's 212 are placed on one side of the housing 216 near the low-current wall 335, as is shown in FIG. 6. The low-current terminals 260 are installed on the low-current wall 335. In an alternate example, the PDU 204 and one or more AEB's 212 are installed near different sidewalls 330. For instance, the PDU 204 is installed near the low-current wall 335 and each AEB 212 is installed near another sidewall 330. The low-current terminals 260 may be installed on more than one sidewall 330, such as on two sidewalls 330 on opposite sides. Further, the positive bus 220 and negative bus 224 of the power bus 208 can be positioned in a variety of ways during installation. In one example, the positive bus 220 and negative bus 224 may be installed near the high-current wall 340, as shown in FIG. 5. The high-current terminals 264 can be installed on the high-current wall 340. The positive bus 220 and negative bus 224 in another variation are installed between the PDU 204 and at least one AEB 212 within the housing 216. For instance, the positive bus 220 and negative bus 224 can be installed between the PDU 204 that is positioned near the low-current wall 335 and the AEB 212 that is positioned near the high-current wall 340. The order in which components are assembled can also be altered. In one example, the power bus 208 is installed first and the PDU 204 is installed second. In another example, the power bus 208 is installed after the PDU 204.

A technique for installing the power distribution system 105 will now be described with reference to FIGS. 1, 2, 3, and 9. The technique includes mechanically coupling the power distribution system 105 to the vehicle frame 905 through the housing 216. The housing 216 couples to the vehicle frame 905 using one or more bolts, harnesses, adhesives, and/or other fasteners. In one embodiment, the housing 216 is coupled to the vehicle frame 905 on only one side. In another embodiment, the housing 216 is coupled to the vehicle frame 905 on multiple sides. As should be appreciated, the power distribution system 105 can be oriented against the vehicle frame 905 in a variety of ways, such as in a horizontal direction, in a vertical direction, or in another direction.

The technique further includes electrically coupling one or more ancillary devices 110, inverters 120, and/or ESS's 125 to the power distribution system 105. During installation, the ancillary devices 110, inverters 120, and/or ESS's 125 are electrically coupled to the low-current terminals 260 and/or high-current terminals 264 on the power distribution system 105 using cables, wires, and/or other types of electrical conductors. In one embodiment, the ancillary devices 110, inverters 120, or ESS's 125 are coupled to the power distribution system 105 before the power distribution system 105 is mechanically coupled to the vehicle frame 905. In another embodiment of the method, the power distribution system 105 is mechanically coupled to the vehicle frame 905 before the ancillary devices 110, inverters 120, or ESS's 125 are connected to the power distribution system 105. As should be appreciated, the connectors can mechanically couple the ancillary devices 110, inverters 120, and/or ESS's 125 to the power distribution system 105 to some degree in addition to providing an electrical connection.

A technique for repairing the power distribution system 105 will be described with reference to FIGS. 1-3. The technique involves disassembling and reassembling the power distribution system 105. In one embodiment, one or more AEB's 212 are removed and replaced with one or more functioning AEB's 212 to repair the power distribution system 105. For example, the AEB's 212 are broken malfunctioning, and/or need to be replaced for other reasons. In another embodiment, other parts besides the AEB's 212 are removed in addition to the AEB's 212. During the repair, one or more parts of the power distribution system 105 remain coupled to the vehicle frame 905 and positioned within the vehicle 100. In another example, the power distribution system 105 is removed from the vehicle 100 during repair. In one embodiment, the power distribution system 105 is removed and replaced with a different power distribution system 105 in order to perform the repair.

Glossary of Terms

The language used in the claims and specification is to only have its plain and ordinary meaning, except as explicitly defined below. The words in these definitions are to only have their plain and ordinary meaning. Such plain and ordinary meaning is inclusive of all consistent dictionary definitions from the most recently published Webster's dictionaries and Random House dictionaries. As used in the specification and claims, the following definitions apply to these terms and common variations thereof identified below.

"Ancillary Device" generally refers to any equipment within a system that performs a function outside a primary function of the system. The ancillary device may include a machine, actuator, sensor, instrument, computational device, controller, tool, imaging device, entertainment device, and/or monitoring device, to name just a few examples. The operation of the system is generally unaffected by the removal of one or more of the ancillary devices. For a vehicle, the primary function is to propel and direct (e.g., steer) the vehicle, so any activity outside of these primary functions would be considered ancillary. Some common non-limiting examples of ancillary devices for vehicles include radios, entertainment systems, lighting systems, and HVAC (heating, ventilation, and air conditioning) systems.

"And/Or" generally refers to a grammatical conjunction indicating that one or more of the cases it connects may occur. For instance, it can indicate that either or both of the two stated cases can occur. In general, "and/or" includes any combination of the listed collection. For example, "X, Y, and/or Z" encompasses: any one letter individually (e.g., {X}, {Y}, {Z}); any combination of two of the letters (e.g., {X, Y}, {X, Z}, {Y, Z}); and all three letters (e.g., {X, Y, Z}). Such combinations may include other unlisted elements as well.

"Cable" generally refers to one or more elongated strands of material that may be used to carry electromagnetic or electrical energy. A metallic or other electrically conductive material may be used to carry electric current. In another example, strands of glass, acrylic, or other substantially transparent material may be included in a cable for carrying light such as in a fiber-optic cable. A cable may include connectors at each end of the elongated strands for connecting to other cables to provide additional length. A cable is generally synonymous with a node in an electrical circuit and provides connectivity between elements in a circuit but does not include circuit elements. Any voltage drop across a cable is therefore a function of the overall resistance of the material used. A cable may include a sheath or layer surrounding the cable with electrically non-conductive material to electrically insulate the cable from inadvertently electrically connecting with other conductive material adjacent the cable. A cable may include multiple individual component cables, wires, or strands, each with, or without, a non-conductive sheathing. A cable may also include a non-conductive sheath or layer around the conductive material, as well as one or more layers of conductive shielding material around the non-conductive sheath to capture stray electromagnetic energy that may be transmitted by electromagnet signals traveling along the conductive material of the cable, and to insulate the cable from stray electromagnetic energy that may be present in the environment the cable is passing through. Examples of cables include twisted pair cable, coaxial cable, "twin-lead", fiber-optic cable, hybrid optical and electrical cable, ribbon cables with multiple side-by-side wires, and the like.

"Circuit Board" or "Board" generally refers to a piece of hardware that contains an electrical circuit assembly. The circuit assembly may include one or more electrical or electromechanical circuit components including capacitors, inductors, semiconductors, switches, resistors, and programmable devices. The board may contain any number of terminals that enable electrical connections to external electrical circuits or components. Electrical inputs to one or more terminals on the board may be altered and output to one or more different terminals. Electrical inputs may also be routed between any number of terminals without being altered.

"Conductor" or "Conductive Material" generally refers to a material and/or object that allows the free flow of an electrical charge in one or more directions such that relatively significant electric currents will flow through the material under the influence of an electric field under normal operating conditions. By way of non-limiting examples, conductors include materials having low resistivity, such as most metals (e.g., copper, gold, aluminum, etc.), graphite, and conductive polymers.

"Contactor" generally refers to a device that provides an electrical connection between two or more points and can be switched to a disconnected state. The contactor may include two or more contact terminals that form a conductive path when the contactor is in a connected state. The contactor may additionally include one or more control terminals that receive a signal to connect or disconnect the contact terminals. Electrical connection between the contact terminals may be a default state of the contactor. The contactor may also be suited to insulate high-voltages or conduct high-currents. The switching of the contact terminal connections may be achieved through electromechanical or solid-state devices.

"Controller" generally refers to a device, using mechanical, hydraulic, pneumatic electronic techniques, and/or a microprocessor or computer, which monitors and physically alters the operating conditions of a given dynamical system. In one non-limiting example, the controller can include an Allen Bradley brand Programmable Logic Controller (PLC). A controller may include a processor for performing calculations to process input or output. A controller may include a memory for storing values to be processed by the processor, or for storing the results of previous processing. A controller may also be configured to accept input and output from a wide array of input and output devices for receiving or sending values. Such devices include other computers, keyboards, mice, visual displays, printers, industrial equipment, and systems or machinery of all types and sizes. For example, a controller can control a network or network interface to perform various network communications upon request. The network interface may be part of the controller or characterized as separate and remote from the controller. A controller may be a single, physical, computing device such as a desktop computer, or a laptop computer, or may be composed of multiple devices of the same type such as a group of servers operating as one device in a networked cluster, or a heterogeneous combination of different computing devices operating as one controller and linked together by a communication network. The communication network connected to the controller may also be connected to a wider network such as the Internet. Thus, a controller may include one or more physical processors or other computing devices or circuitry and may also include any suitable type of memory. A controller may also be a virtual computing platform having an unknown or fluctuating number of physical processors and memories or memory devices. A controller may thus be physically located in one geographical location or physically spread across several widely scattered locations with multiple processors linked together by a communication network to operate as a single controller. Multiple controllers or computing devices may be configured to communicate with one another or with other devices over wired or wireless communication links to form a network. Network communications may pass through various controllers operating as network appliances such as switches, routers, firewalls or other network devices or interfaces before passing over other larger computer networks such as the Internet. Communications can also be passed over the network as wireless data transmissions carried over electromagnetic waves through transmission lines or free space. Such communications include using Wi-Fi or other Wireless Local Area Network (WLAN) or a cellular transmitter/receiver to transfer data.

"Controller Area Network" or "CAN" generally refers to a vehicle bus standard designed to allow microcontrollers, sensors, and/or other devices to communicate with each other in applications without necessarily a host computer. CAN systems include a message-based protocol, designed originally for multiplex electrical wiring within automobiles, but is also used in many other contexts. A vehicle with a CAN system may normally, but not always, includes multiple Electronic Control Units (ECUs) which can be also called nodes. These ECUs can include Engine Control Modules (ECMs) and Transmission Control Modules (TCMs) as well as other control units such as for airbags, antilock braking/ABS, cruise control, electric power steering, audio systems, power windows, doors, mirror adjustment, battery and/or hybrid/electric recharging systems, to name just a few. A CAN includes a multi-master serial bus standard for connecting ECUs. The complexity of the ECU or node can range from a simple Input/Output (I/O) device up to an embedded computer with a CAN interface and software. The ECU or node can also act as a gateway allowing a general-purpose computer to communicate over an interface, such as via a USB and/or Ethernet port, to the devices on the CAN network. Each ECU usually, but not always, includes a central processing unit, a CAN controller, and transceiver. The CAN systems can for example include low speed CAN (128 Kbps) under the ISO 11898-3 standard, high speed CAN (512 Kbps) under the ISO 11898-2 standard, CAN FD under the ISO 11898-1 standard, and single wire CAN under the SAE J2411 standard.

"Couple" or "Coupled" generally refers to an indirect and/or direct connection between the identified elements, components, and/or objects. Often the manner of the coupling will be related specifically to the manner in which the two coupled elements interact.

"Current" generally refers to the rate of flow of electric charge past a point or region of an electric circuit. An electric current is said to exist when there is a net flow of electric charge through a region.

"Electric Motor" generally refers to an electrical machine that converts electrical energy into mechanical energy. Normally, but not always, electric motors operate through the interaction between one or more magnetic fields in the motor and winding currents to generate force in the form of rotation. Electric motors can be powered by direct current (DC) sources, such as from batteries, motor vehicles, and/or rectifiers, or by alternating current (AC) sources, such as a power grid, inverters, and/or electrical generators. An electric generator can (but not always) be mechanically identical to an electric motor, but operates in the reverse direction, accepting mechanical energy and converting the mechanical energy into electrical energy.

"Electrical Connection" generally refers a connection between two objects that allows a flow of electric current and/or electric signals.

"Energy Storage System" (ESS) or "Energy Storage Unit" generally refers to a device that captures energy produced at one time for use at a later time. The energy can be supplied to the ESS in one or more forms, for example including radiation, chemical, gravitational potential, electrical potential, electricity, elevated temperature, latent heat, and kinetic types of energy. The ESS converts the energy from forms that are difficult to store to more conveniently and/or economically storable forms. By way of non-limiting examples, techniques for accumulating the energy in the ESS can include: mechanical capturing techniques, such as compressed air storage, flywheels, gravitational potential energy devices, springs, and hydraulic accumulators; electrical and/ or electromagnetic capturing techniques, such as using capacitors, super capacitors, and superconducting magnetic energy storage coils; biological techniques, such as using glycogen, biofuel, and starch storage mediums; electrochemical capturing techniques, such as using flow batteries, rechargeable batteries, and ultra batteries; thermal capture techniques, such as using eutectic systems, molten salt storage, phase-change materials, and steam accumulators; and/or chemical capture techniques, such as using hydrated salts, hydrogen, and hydrogen peroxide. Common ESS examples include lithium-ion batteries and super capacitors.

"Face" generally refers to a surface that forms part of the boundary of a solid object. A face can be a flat surface on a three-dimensional object. A face may also refer to a non-flat surface that includes curves.

"Fastener" generally refers to a hardware device that mechanically joins or otherwise affixes two or more objects together. By way of non-limiting examples, the fastener can include bolts, dowels, nails, nuts, pegs, pins, rivets, screws, buttons, hook and loop fasteners, and snap fasteners, to just name a few.

"Frame" generally refers to a structure that forms part of an object and gives strength and/or shape to the object.

"Fuse" generally refers to an electrical safety device that protects an electric circuit from excessive electric current. The fuse is designed to be a sacrificial device. Once the fuse has operated to create an open circuit, the fuse must be replaced and/or rewired. For example, the fuse may include a material that melts and breaks an electric circuit if the current through the material exceeds a specified safe level.

"Ground" or "Circuit Ground" generally refers to a node in an electrical circuit that is designated as a reference node for other nodes in a circuit. The ground is a reference point in an electrical circuit from which voltages are measured, a common return path for electric current, and/or a direct physical connection to the Earth.

"High-Current" generally refers to current that is above a certain threshold. The threshold may be predetermined based on a current rating or distinguished by a set of conditions. For example, high-current may be distinguished as current that is sufficient to increase the temperature of a given conductor to a certain degree or as current that is above 300 Amps.

"High-Current Terminal" generally refers to an electrical connection point that is suited to carry a high-current. The electrical connection may be coupled to a device or network that are capable of carrying current above a certain threshold. The electrical connection must be capable of carrying current above the threshold. A high-current terminal may include one or more terminals that are capable of carrying currents above the threshold.

"High-Voltage" generally refers to voltage above a certain threshold. The threshold may be predetermined based on a voltage rating or distinguished by a set of conditions. For example, high-voltage may be distinguished as voltage that is sufficient to arc across a certain distance or as voltage that is above 500 Volts.

"Housing" generally refers to a component that covers, protects, and/or supports another thing. A housing can have a unitary construction or made of multiple components. The housing can be made from the same material or a combination of different materials. The housing can include a protective cover designed to contain and/or support one or more mechanical components. Some non-limiting examples of a housing include a case, enclosure, covering, body, and shell.

"Housing" generally refers to a component that covers, protects, or supports another thing. For example, the casing of a desktop computer is its housing component and can be made of multiple materials to protect the internal component.

"Insulator" or "Insulative Material" generally refers to a material and/or object whose internal electric charges do not flow freely such that very little electric current will flow through the material under the influence of an electric field under normal operating conditions. By way of non-limiting examples, insulator materials include materials having high resistivity, such as glass, paper, ceramics, rubber, and plastics.

"Inverter" or "Power Inverter" generally refers to an electronic device and/or circuitry that at least converts direct current (DC) to alternating current (AC). Certain types of inverters can further include a rectifier that converts AC to DC such that the inverter and rectifier functions are combined together to form a single unit that is sometimes referred to as an inverter. The inverter can be entirely electronic or may be a combination of mechanical devices, like a rotary apparatus, and electronic circuitry. The inverter can further include static type inverters that do not use moving parts to convert DC to AC.

"Low-Current" generally refers to current that is below a certain threshold. The threshold can be predetermined based on a current rating or distinguished by a set of conditions. For example, low-current may be distinguished as current that is not sufficient to cause harm to an average adult or as current that is below 100 Amps.

"Low-Current Terminal" generally refers to an electrical connection point that is suited to carry a low-current. The electrical connection may be coupled to a device or network that is only capable of carrying current below a certain threshold. The electrical connection may only be capable of carrying current below the threshold. The low-current terminal may include one or more terminals that only carry current below the threshold.

"Motor" generally refers to a machine that supplies motive power for a device with moving parts. The motor can include rotor and linear type motors. The motor can be powered in any number of ways, such as via electricity, internal combustion, pneumatics, and/or hydraulic power sources. By way of non-limiting examples, the motor can include a servomotor, a pneumatic motor, a hydraulic motor, a steam engine, a pneumatic piston, a hydraulic piston, and/or an internal combustion engine.

"Node" generally refers to an electrical junction between two or more electrical components in which the voltage at all physical points within the node is substantially equal.

"Power Converter" generally refers to a device that changes one form of energy to another form. In electrical systems, power converters change electric energy from one form to another, such as converting alternating current (AC) to direct current (DC) (or vice-versa) and/or changing electrical voltage, current, frequency, and/or phase of the electricity. For DC-to-DC conversion, the power converter can include voltage regulators and/or linear regulators. The power converter can include an inverter to change DC to AC, and the power converter can include a rectifier to change AC to DC. For AC-to-AC conversion, the power converter can include a transformer, autotransformer, variable-frequency transformer, voltage converter, voltage regulator, and/or cycloconverter. These of course are just a few non-limiting examples. Power converters can also change other forms of energy, such as mechanical and/or chemical energy, to name just a few. For instance, the power converter can include a hydraulic pump that converts electrical energy to mechanical energy when the energy storage system is in the form of a hydraulic accumulator.

"Power Distribution System" generally refers to a network that is configured to deliver power to one or more loads. Power distribution networks may transfer any type of power. A common example is an electric power distribution system. In electric power distribution, power can be transferred across electrically conductive materials or can be transmitted wirelessly through electromagnetic fields. The distribution system can deliver power obtained from one or more energy storage devices or external power distribution or transmission networks. Similarly, the loads can include one or more energy storage devices, external power distribution or transmission networks, or devices that consume power.

"Power Take-Off (PTO)" or "PTO Unit" generally refers to a device that transfers power from an engine and/or motor of a vehicle to an external device. PTOs are commonly used to power a variety of accessories, such as winches, pumps, and generators in heavy duty vehicles.

"Pre-charge resistor" generally refers to a device that limits the current into a component during switching into an electrically connected state. The pre-charge resistor can be any type of resistor. The pre-charge resistor may also include a switch and a device to control its switching. The component may include any electrical load that consumes or transfers power. The pre-charge resistor may include two or more terminals. Power may be provided to one or more terminals and the component may connect to one or more different terminals of the pre-charge resistor.

"Root mean square" or "RMS" generally refers to an average value of a signal or a set of numbers. Specifically, the RMS of a set of numbers is the square root of the mean value of the set squared. In some cases, the RMS value for a signal is determined based on the mean value of the signal over one cycle. For example, the RMS value of an AC current or voltage can be determined based on one cycle of the current or voltage signal. In other cases, the RMS value of a signal is determined based on the mean value of the signal over an arbitrary period of time, such as thirty seconds, one minute, five minutes, one hour, or one day as examples. For example, the current and/or voltage on a conductor may fluctuate irregularly and the RMS value of the current and/or voltage can be determined on an hourly basis. Generally, but not always, the steady state and/or normal operational value of a signal is denoted by the RMS value of the signal.

"Sensor" generally refers to an object whose purpose is to detect events and/or changes in the environment of the sensor, and then provide a corresponding output. Sensors include transducers that provide various types of output, such as electrical and/or optical signals. By way of nonlimiting examples, the sensors can include pressure sensors, ultrasonic sensors, humidity sensors, gas sensors, motion sensors, acceleration sensors, displacement sensors, force sensors, optical sensors, and/or electromagnetic sensors. In some examples, the sensors include barcode readers, RFID readers, and/or vision systems.

"Terminal" generally refers to a plug, socket or other connection (male, female, mixed, hermaphroditic, or otherwise) for mechanically and electrically connecting two or more wires or other conductors.

"Vehicle" generally refers to a machine that transports people and/or cargo. Common vehicle types can include land-based vehicles, amphibious vehicles, watercraft, aircraft, and space craft. By way of non-limiting examples, land-based vehicles can include wagons, carts, scooters, bicycles, motorcycles, automobiles, buses, trucks, semitrailers, trains, trolleys, and trams. Amphibious vehicles can for example include hovercraft and duck boats, and watercraft can include ships, boats, and submarines, to name just a few examples. Common forms of aircraft include airplanes, helicopters, autogiros, and balloons, and spacecraft for instance can include rockets and rocket powered aircraft. The vehicle can have numerous types of power sources. For instance, the vehicle can be powered via human propulsion, electrically powered, powered via chemical combustion, nuclear powered, and/or solar powered. The direction, velocity, and operation of the vehicle can be human controlled, autonomously controlled, and/or semi-autonomously controlled. Examples of autonomously or semi-autonomously controlled vehicles include Automated Guided Vehicles (AGVs) and drones.

"Vehicle control system" generally refers to hardware and/or software responsible for issuing commands to various vehicle components. The components may activate steering, throttle, braking, or other operations related to vehicle movement. The vehicle components may also perform power distribution, energy storage, lighting, heating, cooling, monitoring, or communications among other functions. A vehicle control system may base commands on manual or automated inputs. A vehicle control system may also exchange information with the vehicle components.

"Voltage" generally refers to a difference in electric potential between two points. A given voltage value must reference another point such as a ground or neutral point as examples. Voltage can be the result of electric charge build-up, electromagnetic induction, electrochemical processes, piezoelectric effects, or thermoelectric effects as examples.

It should be noted that the singular forms "a," "an," "the," and the like as used in the description and/or the claims include the plural forms unless expressly discussed otherwise. For example, if the specification and/or claims refer to "a device" or "the device", it includes one or more of such devices.

It should be noted that directional terms, such as "up," "down," "top," "bottom," "lateral," "longitudinal," "radial," "circumferential," "horizontal," "vertical," etc., are used herein solely for the convenience of the reader in order to aid in the reader's understanding of the illustrated embodiments, and it is not the intent that the use of these directional terms in any manner limit the described, illustrated, and/or claimed features to a specific direction and/or orientation.

While the invention has been illustrated and described in detail in the drawings and foregoing description, the same is to be considered as illustrative and not restrictive in character, it being understood that only the preferred embodiment has been shown and described and that all changes, equivalents, and modifications that come within the spirit of the inventions defined by the following claims are desired to be protected. All publications, patents, and patent applications cited in this specification are herein incorporated by reference as if each individual publication, patent, or patent application were specifically and individually indicated to be incorporated by reference and set forth in its entirety herein.

REFERENCE NUMBERS 100 vehicle
105 power distribution system
110 ancillary device
115 vehicle control system
120 inverter
125 ESS
130 motor
204 PDU
208 power bus
212 AEB
216 housing
220 positive bus
224 negative bus
228 charge interface contactor
232 charge interface fuse
236 charge interface current sensor
240 vehicle interface
244 ancillary contactor
248 ancillary voltage sensor
252 ancillary current sensor
256 ancillary fuse
260 low-current terminal
264 high-current terminal
268 charge terminal
272 charger input
276 drive motor inverter
280 spare inverter
284 vehicle environmental testing interface
288 ground bonding
305 PDU bus connector
310 high-current terminal connector
315 charge interface connector
320 AEB bus connection
325 pre-charge resistor
330 sidewall
335 low-current wall
340 high-current wall
345 housing safety switch
405 PDU to AEB connector
410 AEB terminal connector
505 negative bus standoff
510 positive bus standoff
805 power distribution system
808 housing
810 sidewall
815 terminal wall
905 vehicle frame

What is claimed is:

1. A power distribution system to distribute electricity for low-current vehicular components using a low-current and high-current vehicular components using a high-current, comprising:

a housing including a low-current wall and a high-current wall;
wherein the low-current wall extends opposite to the high-current wall;
low-current terminals configured to regulate the low-current for the low-current vehicular components;
high-current terminals configured to regulate the high-current for the high-current vehicular components;

wherein the low-current terminals and the high-current terminals are mounted on opposite sides of the housing;
wherein all of the low-current terminals are mounted to the low-current wall;
wherein all of the high-current terminals are mounted to the high-current wall;
a power bus configured to carry the high current;
wherein the power bus includes one or more bus bars;
wherein the bus bars extend parallel to the high-current wall;
wherein the bus bars are positioned proximal to the high-current wall;
wherein the bus bars includes a positive bar and a negative bar arranged in a stacked arrangement;
wherein the high-current terminals are electrically coupled to the power bus;
a power distribution unit (PDU) electrically connected to the bus bars;
an ancillary expansion board (AEB) electrically connected to at least one of the low-current terminals;
wherein the PDU is configured to communicate with the AEB; and
wherein the PDU and AEB are positioned proximal to the low-current wall.

2. The power distribution system of claim 1, wherein:
the PDU is configured to interface with a current sensor; and
the current sensor is configured to measure current at the high-current terminals.

3. The power distribution system of claim 2, further comprising:
an energy storage system (ESS);
wherein the high-current terminal includes a charger input terminal;
wherein the charger input terminal is configured to receive power to charge the ESS; and
wherein the current sensor is configured to measure current at the charger input terminal.

4. The power distribution system of claim 1, further comprising:
an ancillary device; and
wherein the AEB is configured to regulate power flow to the ancillary device.

5. The power distribution system of claim 4, wherein:
the AEB includes a pre-charge resistor; and
the pre-charge resistor is configured to limit in-rush current during powering of the ancillary device.

6. The power distribution system of claim 1, further comprising:
a motor being an electric motor;
an inverter being electrically connected to the motor;
wherein the inverter is electrically connected to the high-current terminals; and
wherein the high-current vehicular components include the inverter.

7. The power distribution system of claim 6, further comprising:
an energy storage system (ESS); and
wherein the inverter is configured to facilitate regenerative braking by the motor to charge the ESS.

8. A power distribution system, comprising:
a housing including one or more sidewalls;
a power distribution
unit (PDU)
mounted to the housing;
an ancillary expansion board (AEB)
mounted to the housing;

wherein the PDU is configured to communicate with the AEB;

one or more bus bars electrically connected to the PDU;

wherein the sidewalls include a high-current wall;

wherein the sidewalls include a low-current wall;

wherein the low-current wall extends opposite to the high-current wall;

wherein the bus bars extend parallel to the high-current wall;

wherein the bus bars are positioned proximal to the high-current wall;

wherein the PDU and AEB are positioned proximal to the low-current wall;

one or more high-current terminals electrically coupled to the bus bars;

wherein the high-current terminals are mounted to the high-current wall;

one or more low-current terminals electrically coupled to the AEB; and wherein the low-current terminals are mounted to the low-current wall.

9. The power distribution system of claim 8, wherein:

the PDU is configured to interface with a current sensor; and the current sensor is configured to measure current at the high-current terminals.

10. The power distribution system of claim 9, further comprising:

an energy Storage System (ESS);

wherein the high-current terminal includes a charger input terminal;

wherein the charger input terminal is configured to receive power to charge the ESS; and wherein the current sensor is configured to measure current at the charger input terminal.

11. The power distribution system of claim 8, further comprising:

an ancillary device; and wherein the AEB is configured to regulate power flow to the ancillary device.

12. The power distribution system of claim 11, wherein:

the AEB includes a pre-charge resistor; and the pre-charge resistor is configured to limit in-rush current during powering of the ancillary device.

13. The power distribution system of claim 8, further comprising:

a motor being an electric motor;

an inverter being electrically connected to the motor; and wherein the inverter is electrically connected to the high-current terminals.

14. The power distribution system of claim 13, further comprising:

an energy Storage System (ESS); and wherein the inverter is configured to facilitate regenerative braking by the motor to charge the ESS.

* * * * *